(12) United States Patent
Duraisingh et al.

(10) Patent No.: US 12,197,299 B2
(45) Date of Patent: Jan. 14, 2025

(54) BUILDING SYSTEM WITH LEDGER BASED SOFTWARE GATEWAYS

(71) Applicant: Tyco Fire & Security GmbH, Neuhausen am Rheinfall (CH)

(72) Inventors: Pravin J. Duraisingh, Mequon, WI (US); Sujith J. Ebenezer, Milwaukee, WI (US); Sankeeth K. Chinta, Milwaukee, WI (US); Sudhi R. Sinha, Milwaukee, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 102 days.

(21) Appl. No.: 17/127,303

(22) Filed: Dec. 18, 2020

(65) Prior Publication Data

US 2021/0191826 A1 Jun. 24, 2021

Related U.S. Application Data

(60) Provisional application No. 62/951,897, filed on Dec. 20, 2019.

(51) Int. Cl.
*G06F 11/14* (2006.01)
*G06F 9/48* (2006.01)
(Continued)

(52) U.S. Cl.
CPC ........ *G06F 11/1471* (2013.01); *G06F 9/4843* (2013.01); *G06F 16/23* (2019.01);
(Continued)

(58) Field of Classification Search
CPC ............. G06F 11/1471; G06F 11/2025; G06F 11/2038; G06F 16/23; G06F 16/27;
(Continued)

(56) References Cited

U.S. PATENT DOCUMENTS

| | | |
|---|---|---|
| 5,301,109 A | 4/1994 | Landauer et al. |
| 5,446,677 A | 8/1995 | Jensen et al. |

(Continued)

FOREIGN PATENT DOCUMENTS

| | | |
|---|---|---|
| CN | 101415011 A | 4/2009 |
| CN | 102136099 A | 7/2011 |

(Continued)

OTHER PUBLICATIONS

E+E Elektronik, "Pics EE600D & EE610D: BACnet Protocol Implementation Conformance Statement," URL: https://downloads.epluse.com/fileadmin/data/product/PICS/PICS_EE600D_EE610D.pdf, retrieved Jan. 11, 2021, 8 pages.

(Continued)

*Primary Examiner* — Greg C Bengzon
(74) *Attorney, Agent, or Firm* — Foley & Lardner LLP

(57) ABSTRACT

A method of software gateways of a building, the method including generating a ledger file including a description of a first software gateway, wherein the ledger file further includes first point assignments for the first software gateway and second point assignments for a second software gateway, wherein a first computing system implements the first software gateway and a second computing system implements the second software gateway and communicating the ledger file to the first software gateway and the second software gateway. The method further including managing, by the first software gateway, first points of the first point assignments based on the ledger file and managing, by the second software gateway, second points of the second point assignments based on the ledger file and determining, by the second software gateway, a status of the first software gateway based on the description of the first software gateway of the ledger file.

20 Claims, 12 Drawing Sheets

(51) Int. Cl.
*G06F 16/23* (2019.01)
*G06F 16/27* (2019.01)
*H04L 12/66* (2006.01)
*H04L 41/06* (2022.01)

(52) U.S. Cl.
CPC ............. *G06F 16/27* (2019.01); *H04L 12/66* (2013.01); *H04L 41/06* (2013.01); *G06F 2201/82* (2013.01)

(58) Field of Classification Search
CPC .. G06F 2201/82; G06F 9/4843; G06F 9/5072; G06F 9/54; G06F 21/64; G06F 11/1482; G06F 16/1805; G06F 2209/505; G06F 9/5061; G06F 1/28; G06F 1/305; G06F 1/3278; G06F 11/008; G06F 11/0709; G06F 11/0724; G06F 11/0757; G06F 11/1451; G06F 11/202; G06F 11/2023; G06F 11/2028; G06F 12/1018; G06F 16/182; G06F 16/219; G06F 16/2379; G06F 16/242; G06F 16/245; G06F 16/9566; G06F 21/125; G06F 21/44; G06F 21/57; G06F 21/572; G06F 21/575; G06F 21/602; G06F 2211/005; G06F 3/0412; G06F 3/044; G06F 3/04812; G06F 3/1446; G06F 8/61; G06F 8/65; G06F 9/4411; G06F 9/44505; G06F 9/5066; G06F 9/542; G06F 9/547; H04L 12/66; H04L 41/046; H04L 41/06; H04L 41/0893; H04L 41/40; H04L 43/10; H04L 43/20; H04L 67/12; H04L 9/50; H04L 9/3239; H04L 2209/805; H04L 9/0637; H04L 9/3247; H04L 63/0428; H04L 63/123; H04L 67/02; H04L 67/125; H04L 9/3236; H04L 41/0806; H04L 63/12; H04L 63/126; H04L 67/1097; H04L 67/34; H04L 9/0643; H04L 9/0825; H04L 9/14; H04L 9/3263; H04L 9/3297; H04L 12/12; H04L 12/4625; H04L 2209/56; H04L 2209/80; H04L 63/0435; H04L 63/061; H04L 63/062; H04L 63/08; H04L 63/0823; H04L 67/104; H04L 67/141; H04L 67/306; H04L 69/40; H04L 9/0841; H04L 9/0877; H04L 9/0891; H04L 9/0894; H04L 9/3226; H04L 1/0002; H04L 1/004; H04L 1/0041; H04L 1/08; H04L 1/18; H04L 12/28; H04L 12/2807; H04L 12/2816; H04L 12/40; H04L 12/40039; H04L 12/403; H04L 12/42; H04L 12/437; H04L 2012/40273; H04L 2012/4028; H04L 2101/622; H04L 2209/84; H04L 2463/062; H04L 41/0266; H04L 41/0654; H04L 41/0813; H04L 41/082; H04L 41/0823; H04L 41/085; H04L 41/0853; H04L 41/0869; H04L 41/0886; H04L 41/12; H04L 41/142; H04L 41/20; H04L 41/28; H04L 41/5025; H04L 43/04; H04L 43/045; H04L 43/0811; H04L 43/0817; H04L 43/16; H04L 45/128; H04L 45/24; H04L 47/122; H04L 5/0064; H04L 51/18; H04L 63/0869; H04L 63/10; H04L 63/108; H04L 63/166; H04L 63/18; H04L 65/102; H04L 67/025; H04L 67/1001; H04L 67/101; H04L 67/1021; H04L 67/1046; H04L 67/1048; H04L 67/1076; H04L 67/288; H04L 67/289; H04L 67/303; H04L 67/56; H04L 67/563; H04L 67/63; H04L 69/00; H04L 9/006; H04L 9/06; H04L 9/0618; H04L 9/065; H04L 9/0819; H04L 9/0822; H04L 9/0838; H04L 9/0844; H04L 9/085; H04L 9/0866; H04L 9/0869; H04L 9/32; H04L 9/3215; H04L 9/3218; H04L 9/3242; H04L 9/3255; H04L 9/3265; H04L 9/34; H04L 9/38; H04W 4/70; H04W 4/80; H04W 4/38; H04W 84/18; H04W 84/12; H04W 12/04; H04W 12/06; H04W 12/08; H04W 12/35; H04W 4/029; H04W 4/50; H04W 8/18; H04W 12/009; H04W 12/02; H04W 12/03; H04W 12/50; H04W 12/71; H04W 12/77; H04W 24/04; H04W 4/00; H04W 4/021; H04W 48/18; H04W 72/0453; H04W 8/005; H04W 8/26; H04W 88/02; H04W 88/16; H04W 12/033; H04W 12/037; H04W 12/041; H04W 12/0431; H04W 12/047; H04W 12/068; H04W 12/069; H04W 12/108; H04W 12/40; H04W 12/69; H04W 24/00; H04W 24/02; H04W 24/10; H04W 4/024; H04W 4/027; H04W 4/12; H04W 4/30; H04W 4/40; H04W 40/244; H04W 48/08; H04W 52/0209; H04W 52/0216; H04W 52/0219; H04W 52/0222; H04W 52/0235; H04W 52/0241; H04W 52/0245; H04W 52/0261; H04W 56/00; H04W 56/001; H04W 72/10; H04W 72/1278; H04W 76/10; H04W 76/11; H04W 76/14; H04W 76/15; H04W 76/38; H04W 8/04; H04W 8/12; H04W 80/00; H04W 84/10; H04W 88/04; H04W 88/06; G05B 15/02; G05B 2219/2642; G05B 13/0265; G05B 19/042; G05B 19/0425; G05B 2219/25011; G05B 2219/25252; G05B 2219/2614; G05B 2219/2628; G05B 23/0229; G05B 13/028; G05B 19/0421; G05B 19/0426; G05B 19/4183; G05B 19/4184; G05B 19/41845; G05B 19/4185; G05B 19/41865; G05B 19/41875; G05B 2219/25428; G05B 2219/2613; G05B 2219/31282; G05B 2219/32287; G05B 2219/33331; G05B 2219/35001; G05B 2219/37337; G05B 2219/37351; G05B 2219/37434; G05B 2219/40115; G05B 2219/45004; G05B 2219/45129; G05B 23/0221; G05B 23/0235; G05B 23/024; G05B 23/0264; G05B 23/0283; G05B 23/0286; G05B 23/0289; G05B 23/0291; G05B 23/0294; G05B 23/0297

See application file for complete search history.

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |

(56) References Cited

U.S. PATENT DOCUMENTS

| | | |
|---|---|---|
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,209,968 B1* | 4/2007 | Secer ............... H04L 41/0213 |
| | | 707/999.01 |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,069,827 B1* | 6/2015 | Rath ................. G06F 16/273 |
| 9,070,113 B2 | 6/2015 | Shafiee et al. |
| 9,092,296 B1* | 7/2015 | Nay ................... G06F 8/654 |
| 9,116,862 B1* | 8/2015 | Rath ................. G06F 3/0653 |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,489,434 B1* | 11/2016 | Rath ................. G06F 16/25 |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2* | 9/2017 | Drees ................. G06Q 10/06 |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 9,984,140 B1* | 5/2018 | Sukumaran ............. G06F 16/27 |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,586 B2 | 1/2019 | Shaashua et al. |
| 10,187,258 B2 | 1/2019 | Nagesh et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,627,882 B2* | 4/2020 | Swierk ................. H04L 67/12 |
| 10,693,716 B2* | 6/2020 | Patil ................... H04W 12/08 |
| 10,705,492 B2 | 7/2020 | Harvey |
| 10,708,078 B2 | 7/2020 | Harvey |
| 10,845,771 B2 | 11/2020 | Harvey |
| 10,854,194 B2 | 12/2020 | Park et al. |
| 10,862,928 B1 | 12/2020 | Badawy et al. |
| 10,880,743 B1* | 12/2020 | Berzin ............... H04L 41/0806 |
| 10,921,760 B2 | 2/2021 | Harvey |
| 10,921,972 B2 | 2/2021 | Park et al. |
| 10,958,434 B1* | 3/2021 | Marquardt ............. H04L 43/10 |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,229,138 B1 | 1/2022 | Harvey et al. |
| 11,314,726 B2 | 4/2022 | Park et al. |
| 11,314,788 B2 | 4/2022 | Park et al. |
| 11,415,464 B2* | 8/2022 | Pop ..................... G06F 1/305 |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |

(56) References Cited

U.S. PATENT DOCUMENTS

| | | |
|---|---|---|
| 2010/0165832 A1* | 7/2010 | Kini ................. H04L 43/0811 370/217 |
| 2010/0205152 A1* | 8/2010 | Ansari ............... H04L 12/2812 711/E12.001 |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086245 A1* | 4/2013 | Lu ..................... H04L 12/66 709/250 |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0111261 A1* | 5/2013 | Dalton ............... G06F 11/2028 714/E11.073 |
| 2013/0167035 A1 | 6/2013 | Imes et al. |
| 2013/0170710 A1 | 7/2013 | Kuoch et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0095191 A1* | 3/2016 | Vangeel ................ H02J 3/00 717/177 |
| 2016/0095192 A1* | 3/2016 | Vangeel ............. F24F 11/62 315/153 |
| 2016/0105320 A1* | 4/2016 | Osterberg ......... H04L 67/125 709/208 |
| 2016/0119434 A1 | 4/2016 | Dong et al. |
| 2016/0127712 A1 | 5/2016 | Ag |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |

(56) References Cited

U.S. PATENT DOCUMENTS

| | | | |
|---|---|---|---|
| 2017/0134415 A1 | 5/2017 | Muddu et al. | |
| 2017/0156076 A1* | 6/2017 | Eom | H04W 4/70 |
| 2017/0171747 A1* | 6/2017 | Britt | H04W 12/0431 |
| 2017/0177715 A1 | 6/2017 | Chang et al. | |
| 2017/0180147 A1 | 6/2017 | Brandman et al. | |
| 2017/0188216 A1 | 6/2017 | Koskas et al. | |
| 2017/0207957 A1* | 7/2017 | Wacker | F24F 11/49 |
| 2017/0212482 A1 | 7/2017 | Boettcher et al. | |
| 2017/0212668 A1 | 7/2017 | Shah et al. | |
| 2017/0220641 A1 | 8/2017 | Chi et al. | |
| 2017/0230930 A1 | 8/2017 | Frey | |
| 2017/0235817 A1 | 8/2017 | Deodhar et al. | |
| 2017/0251182 A1 | 8/2017 | Siminoff et al. | |
| 2017/0270124 A1 | 9/2017 | Nagano et al. | |
| 2017/0277769 A1 | 9/2017 | Pasupathy et al. | |
| 2017/0278003 A1 | 9/2017 | Liu | |
| 2017/0288955 A1* | 10/2017 | Yin | H04L 43/0817 |
| 2017/0294132 A1 | 10/2017 | Colmenares | |
| 2017/0315522 A1 | 11/2017 | Kwon et al. | |
| 2017/0315697 A1 | 11/2017 | Jacobson et al. | |
| 2017/0322534 A1 | 11/2017 | Sinha et al. | |
| 2017/0323389 A1 | 11/2017 | Vavrasek | |
| 2017/0329289 A1 | 11/2017 | Kohn et al. | |
| 2017/0336770 A1 | 11/2017 | Macmillan | |
| 2017/0345287 A1 | 11/2017 | Fuller et al. | |
| 2017/0351957 A1 | 12/2017 | Lecue et al. | |
| 2017/0357225 A1 | 12/2017 | Asp et al. | |
| 2017/0357490 A1 | 12/2017 | Park et al. | |
| 2017/0357908 A1 | 12/2017 | Cabadi et al. | |
| 2018/0007002 A1* | 1/2018 | Landgraf | H04L 12/66 |
| 2018/0012159 A1 | 1/2018 | Kozloski et al. | |
| 2018/0013579 A1 | 1/2018 | Fairweather et al. | |
| 2018/0024520 A1 | 1/2018 | Sinha et al. | |
| 2018/0039238 A1 | 2/2018 | Ag | |
| 2018/0048485 A1 | 2/2018 | Pelton et al. | |
| 2018/0062831 A1* | 3/2018 | Zhang | H04L 9/3297 |
| 2018/0069932 A1 | 3/2018 | Tiwari et al. | |
| 2018/0114140 A1 | 4/2018 | Chen et al. | |
| 2018/0129172 A1* | 5/2018 | Shrivastava | G05B 13/0265 |
| 2018/0137288 A1 | 5/2018 | Polyakov | |
| 2018/0157930 A1 | 6/2018 | Rutschman et al. | |
| 2018/0162400 A1 | 6/2018 | Abdar | |
| 2018/0176241 A1 | 6/2018 | Manadhata et al. | |
| 2018/0198627 A1 | 7/2018 | Mullins | |
| 2018/0203961 A1 | 7/2018 | Aisu et al. | |
| 2018/0234489 A1* | 8/2018 | Hammons | H04L 67/12 |
| 2018/0239982 A1 | 8/2018 | Rutschman et al. | |
| 2018/0275625 A1 | 9/2018 | Park et al. | |
| 2018/0276962 A1 | 9/2018 | Butler et al. | |
| 2018/0292797 A1 | 10/2018 | Lamparter et al. | |
| 2018/0309818 A1* | 10/2018 | Park | H04L 67/10 |
| 2018/0336785 A1 | 11/2018 | Ghannam et al. | |
| 2018/0359111 A1 | 12/2018 | Harvey | |
| 2018/0364654 A1 | 12/2018 | Locke et al. | |
| 2019/0005025 A1 | 1/2019 | Malabarba | |
| 2019/0013023 A1 | 1/2019 | Pourmohammad et al. | |
| 2019/0025771 A1 | 1/2019 | Park et al. | |
| 2019/0036906 A1* | 1/2019 | Biyani | H04L 63/20 |
| 2019/0037135 A1 | 1/2019 | Hedge | |
| 2019/0042988 A1 | 2/2019 | Brown et al. | |
| 2019/0088106 A1 | 3/2019 | Grundstrom | |
| 2019/0094824 A1 | 3/2019 | Xie et al. | |
| 2019/0096217 A1 | 3/2019 | Pourmohammad et al. | |
| 2019/0102840 A1 | 4/2019 | Perl et al. | |
| 2019/0138512 A1 | 5/2019 | Pourmohammad et al. | |
| 2019/0147883 A1 | 5/2019 | Mellenthin et al. | |
| 2019/0158309 A1 | 5/2019 | Park et al. | |
| 2019/0163152 A1 | 5/2019 | Worrall et al. | |
| 2019/0190742 A1* | 6/2019 | Reinelt | H04L 12/2807 |
| 2019/0253434 A1* | 8/2019 | Biyani | H04L 63/126 |
| 2019/0268178 A1 | 8/2019 | Fairweather et al. | |
| 2019/0310979 A1 | 10/2019 | Masuzaki et al. | |
| 2019/0332955 A1* | 10/2019 | Manamohan | G06K 9/6256 |
| 2019/0334929 A1* | 10/2019 | Teshome | H04L 63/1408 |
| 2019/0334933 A1* | 10/2019 | Teshome | H04W 12/61 |
| 2019/0334934 A1* | 10/2019 | Teshome | H04W 12/106 |
| 2019/0334954 A1* | 10/2019 | Manamohan | H04L 9/3239 |
| 2019/0372834 A1* | 12/2019 | Patil | H04L 9/3263 |
| 2020/0005415 A1* | 1/2020 | Schuler | H04L 67/1097 |
| 2020/0065763 A1* | 2/2020 | Rosinzonsky | H04L 63/123 |
| 2020/0104161 A1* | 4/2020 | Kapur | G06F 11/2041 |
| 2020/0112609 A1* | 4/2020 | Hardman, III | H04L 45/22 |
| 2020/0150508 A1* | 5/2020 | Patterson | G06F 3/0412 |
| 2020/0204400 A1* | 6/2020 | Skertic | H04L 9/34 |
| 2020/0226156 A1 | 7/2020 | Borra et al. | |
| 2020/0244297 A1* | 7/2020 | Zalewski | H04W 76/10 |
| 2020/0285203 A1 | 9/2020 | Thakur et al. | |
| 2021/0042299 A1 | 2/2021 | Migliori | |
| 2021/0063836 A1* | 3/2021 | Patterson | G05B 19/042 |
| 2021/0084470 A1* | 3/2021 | Chen | G06F 11/1451 |
| 2021/0224721 A1* | 7/2021 | Morgenthau | H04Q 9/00 |
| 2021/0360057 A1* | 11/2021 | Tofighbakhsh | H04L 67/1021 |
| 2021/0381711 A1 | 12/2021 | Harvey et al. | |
| 2021/0381712 A1 | 12/2021 | Harvey et al. | |
| 2021/0382445 A1 | 12/2021 | Harvey et al. | |
| 2021/0383041 A1 | 12/2021 | Harvey et al. | |
| 2021/0383042 A1 | 12/2021 | Harvey et al. | |
| 2021/0383200 A1 | 12/2021 | Harvey et al. | |
| 2021/0383219 A1 | 12/2021 | Harvey et al. | |
| 2021/0383235 A1 | 12/2021 | Harvey et al. | |
| 2021/0383236 A1 | 12/2021 | Harvey et al. | |
| 2021/0391998 A1* | 12/2021 | Minsky | H04L 9/3247 |
| 2022/0066402 A1 | 3/2022 | Harvey et al. | |
| 2022/0066405 A1 | 3/2022 | Harvey | |
| 2022/0066432 A1 | 3/2022 | Harvey et al. | |
| 2022/0066434 A1 | 3/2022 | Harvey et al. | |
| 2022/0066528 A1 | 3/2022 | Harvey et al. | |
| 2022/0066722 A1 | 3/2022 | Harvey et al. | |
| 2022/0066754 A1 | 3/2022 | Harvey et al. | |
| 2022/0066761 A1 | 3/2022 | Harvey et al. | |
| 2022/0067226 A1 | 3/2022 | Harvey et al. | |
| 2022/0067227 A1 | 3/2022 | Harvey et al. | |
| 2022/0067230 A1 | 3/2022 | Harvey et al. | |
| 2022/0069863 A1 | 3/2022 | Harvey et al. | |
| 2022/0070293 A1 | 3/2022 | Harvey et al. | |
| 2022/0138684 A1 | 5/2022 | Harvey | |
| 2022/0215264 A1 | 7/2022 | Harvey et al. | |
| 2023/0010757 A1 | 1/2023 | Preciado | |

FOREIGN PATENT DOCUMENTS

| | | |
|---|---|---|
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 324 306 A1 | 5/2018 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |

(56) References Cited

FOREIGN PATENT DOCUMENTS

| WO | WO-2017/205330 A1 | 11/2017 |
|---|---|---|
| WO | WO-2017/213918 A1 | 12/2017 |

OTHER PUBLICATIONS

Balaji et al, "Brick: Metadata schema for portable smart building applications," Applied Energy, 2018 (20 pages).
Balaji et al, "Brick: Metadata schema for portable smart building applications," Applied Energy, Sep. 15, 2018, 3 pages, (Abstract).
Balaji et al, "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema For Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv- 01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 2, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.

(56) References Cited

OTHER PUBLICATIONS

International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 15 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi, "Making Big Data Work For Your Business: A guide to effective Big Data analytics," Impackt Publishing LTD., Birmingham, UK, Oct. 2014 (170 pages).
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and Park, Youngchoon, "Building an Effective IoT Ecosystem for Your Business," Johnson Controls International, Springer International Publishing, 2017 (286 pages).
The Virtual Nuclear Tourist, "Calvert Cliffs Nuclear Power Plant," URL: http://www.nucleartourist.com/us/calvert.htm, Jan. 11, 2006 (2 pages).
University of California At Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2023 (7 pages).
Van Hoof, Bert, "Announcing Azure Digital Twins: Create digital replicas of spaces and infrastructure using cloud, AI and IoT," URL: https://azure.microsoft.com/en-US/blog/announcing-azure-digital-twins-create-digital-replicas-of-spaces-and-infrastructure-using-cloud-ai-and-iot/, Sep. 24, 2018 (11 pages).
W3C, "Sparql: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
Zhou, Q. et al., "Knowledge-infused and Consistent Complex Event Processing over Real-time and Persistent Streams," Further Generation Computer Systems, 2017, 76 (pp. 391-406).

* cited by examiner

BUILDING SYSTEM WITH LEDGER BASED SOFTWARE GATEWAYS

CROSS-REFERENCE TO RELATED PATENT APPLICATION

This application claims the benefit of and priority to U.S. Provisional Patent Application No. 62/951,897 filed Dec. 20, 2019, the entirety of which is incorporated by reference herein.

BACKGROUND

The present disclosure relates generally to building management systems. The present disclosure relates more particularly to gateways that collect data from building devices.

A building management system may utilize gateway devices to collect and aggregate data from building devices of a building, transmit messages between devices, control devices, etc. The gateway devices can collect data from various points of the building devices, e.g., collect time-series data for sensor data points, actuator data points, control data points, etc. However, the configuration of a gateway may be difficult to set up. For example, a user may need to manually configure and assign points for each gateway. Human error or lack of knowledge may result in an imbalance of gateway resources, i.e., one gateway may be managing to many points while another gateway not managing enough points. Furthermore, when a gateway fails, the points that are managed by the failed gateway may cease to be properly collected. Furthermore, many conventional gateways may suffer from network security issues.

SUMMARY

A method of software gateways of a building, the method including generating a ledger file including a description of a first software gateway, wherein the ledger file further includes first point assignments for the first software gateway and second point assignments for a second software gateway, wherein a first computing system implements the first software gateway and a second computing system implements the second software gateway. The method further including communicating the ledger file to the first software gateway and the second software gateway, managing, by the first software gateway, first points of the first point assignments based on the ledger file and managing, by the second software gateway, second points of the second point assignments based on the ledger file, and determining, by the second software gateway, a status of the first software gateway based on the description of the first software gateway of the ledger file.

In some embodiments, the ledger file is generated by a ledger server in communication with the first software gateway and the second software gateway.

In some embodiments, the method further includes determining, by a ledger server, that the first software gateway has encountered a failure. In some embodiments, the method includes generating, by the ledger server, an updated ledger file including point assignments for the second software gateway, the updated ledger file being an updated version of the ledger file, wherein generating the updated ledger file includes causing a previous point assignment of the first software gateway to be assigned to the second software gateway, communicating, by the ledger server, the updated ledger file to the second software gateway, and managing, by the second software gateway, the point assignments of the updated ledger file.

In some embodiments, the method includes receiving, by the first software gateway, data values of a data point of a piece of building equipment. In some embodiments, the method includes validating, by the first software gateway, the data values based on one or more descriptors of the data point, generating, by the first software gateway, a reliability value for each of the data values based on a validation of each of the data values, and communicating, by the first software gateway, the data values with the reliability value for each of the data values to a building management system.

In some embodiments, the method further includes determining, by the first software gateway, a description of hardware resources of the first computing system on which the first software gateway is implemented, determining, by the first software gateway, one or more operational tasks of the first software gateway, identifying, by the first software gateway, one or more software components based on the description of hardware resources of the first computing system and the one or more operational tasks, retrieving, by the first software gateway, the one or more software components from an external software storage system, and executing, by the first software gateway, the one or more software components.

In some embodiments, the method further includes generating, by a ledger server, the ledger file by dividing a set of points of equipment of the building into the first point assignments and the second point assignments based on first information describing the first computing system, the first computing system running the first software gateway and second information describing the second computing system, the second computing system running the second software gateway.

In some embodiments, the method further includes communicating, by the first software gateway, the first information describing the first computing system, the first computing running the first software gateway to the ledger server and communicating, by the second software gateway, the second information describing the second computing system, the second computing system running the second software gateway to the ledger server.

In some embodiments, the method further includes receiving, by a ledger server, an indication of an addition or a removal of a piece of equipment from a building network of the building, generating, by the ledger server, an updated ledger file including updated point assignments for the first software gateway of the building network, the ledger file being an updated version of the ledger file, wherein generating the ledger file includes causing a previous point assignment of the ledger file to be updated based on the indication of the addition or the removal of the piece of equipment, and communicating, by the ledger server, the updated ledger file to the first software gateway and the second software gateway.

In some embodiments, the method includes performing, by the first software gateway responsive to receiving the updated ledger file, at least one of beginning management of one or more first points of the building network based on the updated point assignments of the updated ledger file or stopping management of one or more second points of the building network based on the updated point assignments of the updated ledger file.

Another implementation of the present disclosure is a building system for managing software gateways of a building, the building system including a ledger server configured to generate a ledger file including a description of a first software gateway, wherein the ledger file further includes first point assignments for the first software gateway and second point assignments for a second software gateway, wherein a first computing system implements the first software gateway and a second computing system implements the second software gateway and communicate the ledger file to the first software gateway and the second software gateway. The building system includes a first software gateway configured to manage first points of the first point assignments based on the ledger file. The building system includes a second software gateway configured to manage second points of the second point assignments based on the ledger file and determine a status of the first software gateway based on the description of the first software gateway of the ledger file.

In some embodiments, the ledger server is configured to determine that the first software gateway has encountered a failure, generate an updated ledger file including point assignments for the second software gateway, the updated ledger file being an updated version of the ledger file, wherein generating the updated ledger file includes causing a previous point assignment of the first software gateway to be assigned to the second software gateway and communicate the updated ledger file to the second software gateway. In some embodiments, the second software gateway is configured to manage the point assignments of the updated ledger file.

In some embodiments, the first software gateway is configured to receive data values of a data point of a piece of building equipment, validate the data values based on one or more descriptors of the data point, generate a reliability value for each of the data values based on a validation of each of the data values, and communicate the data values with the reliability value for each of the data values to a building management system.

In some embodiments, the first software gateway is configured to determine a description of hardware resources of the first computing system on which the first software gateway is implemented, determine one or more operational tasks of the first software gateway, identify one or more software components based on the description of hardware resources of the first computing system and the one or more operational tasks, retrieve the one or more software components from an external software storage system, and execute the one or more software components.

In some embodiments, the ledger server is configured to generate the ledger file by dividing a set of points of equipment of the building into the first point assignments and the second point assignments based on first information describing the first computing system, the first computing system running the first software gateway and second information describing the second computing system, the second computing system running the second software gateway.

In some embodiments, the first software gateway is configured to communicate the first information describing the first computing system, the first computing system running the first software gateway to the ledger server. In some embodiments, the second software gateway is configured to communicate the second information describing the second computing system, the second computing system running the second software gateway to the ledger server.

In some embodiments, the ledger server is configured to receive an indication of an addition or a removal of a piece of equipment from a building network of the building, generate an updated ledger file including updated point assignments for the first software gateway of the building network, the ledger file being an updated version of the ledger file, wherein generating the ledger file includes causing a previous point assignment of the ledger file to be updated based on the indication of the addition or the removal of the piece of equipment, and communicate the updated ledger file to the first software gateway and the second software gateway.

In some embodiments, the first software gateway is configured to perform at least one of, responsive to receiving the updated ledger file beginning management of one or more first points of the building network based on the updated point assignments of the updated ledger file or stopping management of one or more second points of the building network based on the updated point assignments of the updated ledger file.

Another implementation of the present disclosure is one or more storage media storing instructions thereon that, when executed by one or more processors of a computing system, cause the computing system to implement a software gateway configured to receive a ledger file generated by a ledger server, the ledger server generating the ledger file including a description of a second software gateway, wherein the ledger file further includes first point assignments for the software gateway and second point assignments for the second software gateway, wherein second computing system implements the second software gateway, manage first points of the first point assignments based on the ledger file, wherein the second software gateway manages second points of the second point assignments based on the ledger file, and determine a status of the second software gateway based on the description of the second software gateway of the ledger file.

In some embodiments, the software gateway is configured to receive data values of a data point of a piece of building equipment, validate the data values based on one or more descriptors of the data point, generate a reliability value for each of the data values based on a validation of each of the data values, and communicate the data values with the reliability value for each of the data values to a building management system.

In some embodiments, the software gateway is configured to determine a description of hardware resources of the first computing system on which the first software gateway is implemented, determine one or more operational tasks of the first software gateway, identify one or more software components based on the description of hardware resources of the first computing system and the one or more operational tasks, retrieve the one or more software components from an external software storage system, and execute the one or more software components.

Another implementation of the present disclosure is a method of software gateways of a building. The method includes generating, by a ledger server, a ledger file including a description of a first software gateway, wherein the ledger file further includes first point assignments for the first software gateway and second point assignments for a second gateway, wherein a first computing system implements the first software gateway and second computing system implements the second software gateway. The method includes communicating the ledger file to the first software gateway and the second software gateway, managing, by the first software gateway, first points of the first point assignments based on the ledger file and managing, by the second software gateway, second points of the second point assignments based on the ledger file, and determining, by the second software gateway, a status of the first software gateway based on the description of the first software gateway of the ledger.

Another implementation of the present disclosure is a method including communicating, by a first software gateway, first information describing a first computing device running the first software gateway to a ledger server. The method includes communicating, by a second software gateway, second information describing a second computing device running the second software gateway to a ledger server and generating, by the ledger server, a ledger file including first point assignments for the first software gateway and second point assignments for the second gateway by dividing a set of points of equipment of the building into the first point assignments and the second point assignments based on the first information and the second information. The method includes communicating, by the ledger server, the ledger file to the first software gateway and the second software gateway, managing, by the first software gateway, first points of the first point assignments based on the ledger file, and managing, by the second software gateway, second points of the second point assignments based on the ledger file.

Another implementation of the present disclosure is a method of software gateways of a building. The method includes receiving, by a ledger server, an indication of an addition or a removal of a piece of equipment from a building network of the building, generating, by the ledger server, a ledger file including point assignments for a software gateway of the building network, the ledger file being an updated version of a previous ledger file, wherein generating the ledger file includes causing a previous point assignment of the previous ledger file to be updated based on the indication of the addition or the removal of the piece of equipment, communicating, by the ledger server, the ledger file to the software gateway, and performing, by the software gateway, at least one of managing, by the first software gateway, one or more first points of the building network based on the point assignments of the ledger file or stopping management of one or more second points of the building network based on the point assignments of the ledger file.

Another implementation of the present disclosure of the present disclosure is a method of software gateways of a building. The method includes determining, by a ledger server, that a first software gateway has encountered a failure and generating, by the ledger server, a ledger file including point assignments for one or more second software gateways of the building network, the ledger file being an updated version of a previous ledger file, wherein generating the ledger file includes causing a previous point assignment of the first software gateway to be assigned to the one or more second software gateways. The method includes communicating, by the ledger server, the ledger file to the one or more second software gateways and managing, by the one or more second software gateway one or more points of the point assignments of the ledger file.

Another implementation of the present disclosure is a method of a software gateway of a building. The method includes receiving, by the software gateway, a plurality of data values of a data point of a piece of building equipment, wherein the software gateway is implemented by a computing system, validating, by the software gateway, the plurality of data values based on a one or more descriptors of the data point, generating a reliability value for each of the plurality of data values based on a validation of each of the plurality of data values, and communicating, by the software gateway, the plurality of data values with the reliability value for each of the plurality of data values to a building management system.

Another implementation of the present disclosure is a method of a software gateway of a building. The method includes determining, by the software gateway, a description of hardware resources of a computing system on which the software gateway is implemented and determining, by the software gateway, one or more operational tasks of the software gateway. The method includes identifying, by the software gateway, one or more software components based on the description of the hardware resources and the one or more operational tasks, retrieving, by the software gateway, the one or more software components from an external software storage system, and executing, by the software gateway, the one or more software components.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
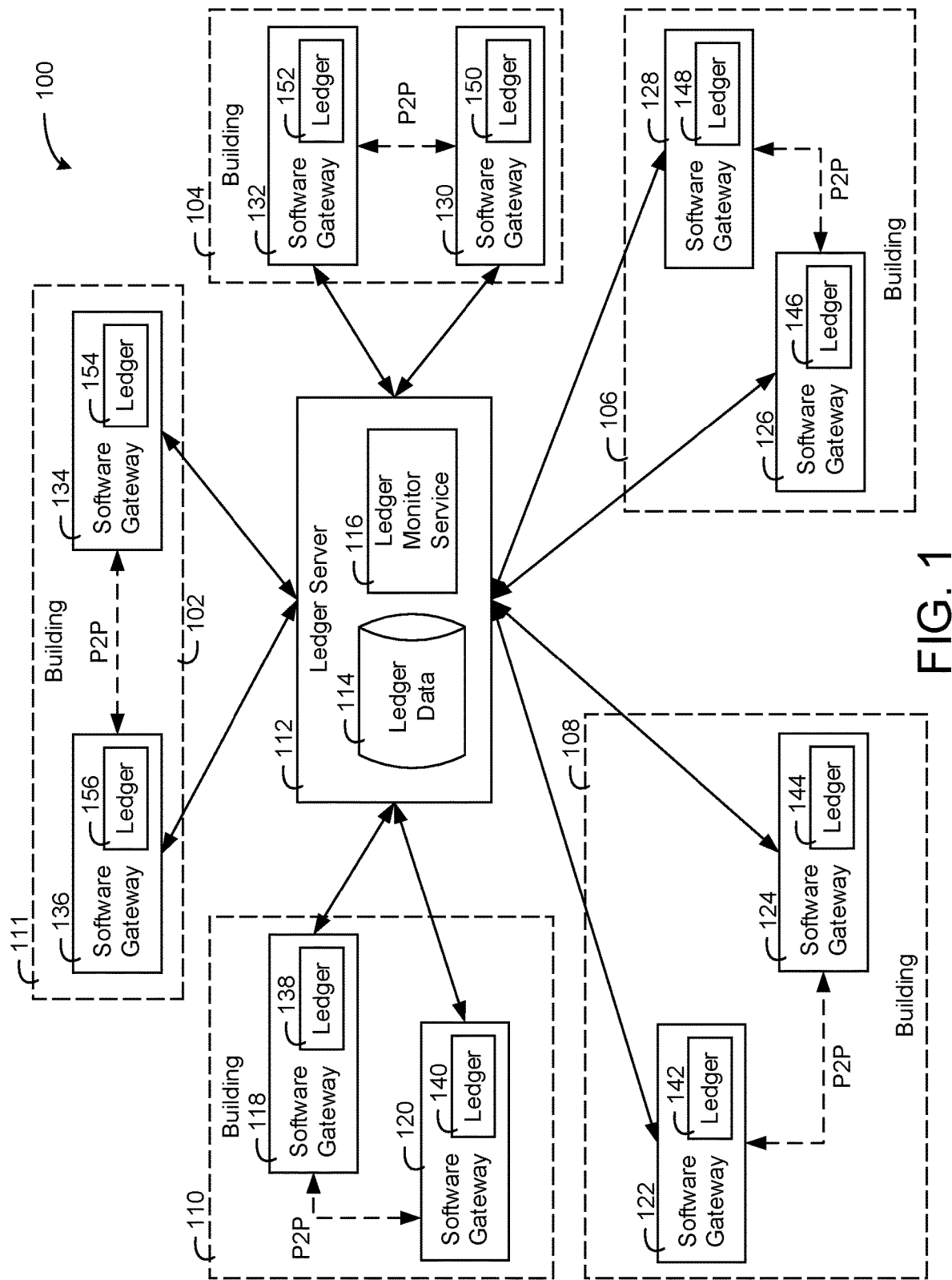
FIG. 1 is a block diagram of a system of software gateways and a distributed ledger server, according to an exemplary embodiment.

Referring generally to the FIGURES, a building system with software gateways is shown, according to various exemplary embodiments. The software gateways can be ledger based gateways in various embodiments. The software gateways can increase reliability, scalability, and security of building data gathering. The software gateways can increase reliability via operational continuity, i.e., if one software gateway fails, another software gateway within the network can be configured to pick up the work load of the failed software gateway. The software gateways can further support clustering; for example, if there are a large number of pieces of building equipment from which data has to be gathered, the load can be shared automatically by multiple software gateways. The software gateways can also realize scalability in the building network. For example, new building devices or new software gateways can be implemented in the network and functions such as data ingestion can be accommodated seamlessly.

The software gateways further realize security benefits for data gathering in a building. For example, the software gateways can securely gather and transmit building data. The software gateways can identify false actors in a building network and isolate the false actors. This detection and isolation prevents data tampering and manipulation. In some embodiments, if one of the software gateways within the building network is taken down by a Denial of Service (DoS) type of attack, the transaction of data within a group of the gateways will be picked up by other software gateways on the building network. In some embodiments, one or more of the software gateways will be configured to monitor one or more other software gateways so that any identified vulnerabilities that have been added by an attacker is discovered by the monitoring, an appropriate action (e.g., isolation) can be taken. In some embodiments, the system could be configured such that each software gateway has the capability to and/or is configured to monitor every other software gateway in the system, either directly or via a centralized or cloud monitoring system.

Via a ledger of the software gateways, metadata can be available across all gateways within a group. At a regular interval, information can be verified across the gateways by a monitoring service of the software gateways that checks for any discrepancies in the gateways against the metadata of the ledger. This cross checking providing the ability to check for data and code tampering. The ledger may be a ledger file stored on each software gateway. The ledger file may include attributes about other gateways, an indication of a total number of building devices, a total number of software gateways, and/or an indication of points of the building devices, which of the software gateways is assigned to read data from which point, etc. The ledger may include data about a particular building or group of buildings indicated by a customer group identifier, a value uniquely identifying a particular customer and equipment of the customer.

Since the ledger file is distributed across all of the software gateways of the building (or a set of the software gateways), manipulating the leger file can be difficult for a hacker. For example, the ledger file on each of the software gateways can be the same, i.e., a copy of a ledger file. The software gateways can cross-check their ledger files to detect any discrepancies in any one of the ledgers and/or whether metadata of a software gateway does not match the metadata of the software gateway included within the ledger files.

If a hacker gains access to one software gateway and manipulates the ledger of the one software gateway, properly operating software gateways can compare the ledger of the compromised software gateway to the ledger file stored on the properly operating software gateways. The properly operating software gateways can detect the discrepancy in the ledger file and raise an alarm and/or isolate the compromised software gateway. In this regard, rather than having a single point of failure that a hacker could attack, a hacker would need to simultaneously compromise all software gateways of a network. This increases the security of the network making it more difficult for a hacker manipulate the software gateways of the network.

Referring now to FIG. 1, a system 100 of software gateways 118-136 and a distributed ledger server 112 is shown, according to an exemplary embodiment. The system 100 illustrates a scenario where multiple gateways, the software gateways 118-136 are connected to the central ledger server 112 and the central ledger server 112 determines workloads for each of the software gateways 118-136. The system 100 illustrates the software gateways 118-136 in multiple buildings, buildings 104-111. The buildings 104-111 can be buildings of one or more campuses, i.e., one or multiple of the buildings 104-111 can be associated with a particular entity. The buildings 104-111 can be schools, apartment buildings, hospitals, airport buildings, commercial office buildings, residential homes, etc.

A single customer may own one or more of the buildings 104-111, each building having its own set of building devices (e.g., HVAC devices, lighting devices, security devices, etc.). To provide reliability and scalability for the buildings, multiple of the software gateways 118-136 can be deployed in a single building or tenant area, i.e., behind a subnet of a customer, to read data from the building devices. Reading data from a building device can include reading data from a point of a piece of equipment. The software gateways 118-136 can subscribe to points or poll points. Subscribing to a point may include receiving a point value change, i.e., a change of value (COV), e.g., when a new sensor value is available. Polling points can include querying a point at a particular interval to retrieve a value of the point, e.g., reading a sensor value every five minutes.

The software gateways 118-136 can be configured to read data from building devices and send the data to the cloud ledger server 112. The cloud ledger server 112 can be configured to determine which of the software gateways 118-136 should be assigned to read data from which building device. Such a determination can be made by a ledger monitor service 116 of the ledger server 112 based on data aggregated in the ledger server 112, ledger data 114. The ledger monitor service 116 can be configured to send gateway assignments to the software gateways 118-136. Each of the software gateways 118-136 can be configured to begin reading data from assigned devices, i.e., from points assigned to the gateway. The assignments, along with indications of the other gateways in a particular customer group, may be included within a ledger generated by the ledger monitor service 116. The ledger can be distributed by the ledger monitor service 116 to the gateways 118-136, i.e., ledgers 138-156. Each of the ledgers 138-156 can be identical, i.e., they are a copy of the ledger generated by the ledger monitor service 116. The ledger server 112 can update the ledger over time, e.g., when a gateway fails and points of the failed gateway needs to be reassigned, when a new device (e.g., piece of equipment or software gateway) is added to the network, etc. The ledger server 112 can distribute updated copies of the ledger to the gateways 118-136.

The ledger server 112 can be a service that resides in the cloud and/or on-premises within one or multiple of the buildings 104-111. The ledger server 112 can be one or multiple server devices or can be software component of a cloud platform, e.g., Amazon Web Services, Microsoft Azure, etc. The ledger server 112 can store data, i.e., ledger data 114, about various customer groups, indications of gateways, indications of building devices, points of the building devices, which building devices and/or points belong to which customer groups, and which gateways read what points.

The ledger monitor service 116 can be configured to run an algorithm to determine which of the software gateways 118-136 should replace or share a load when one of the software gateways 118-136 goes offline, thereby providing reliability in data gathering. Also, when new devices are added to the building (e.g., new building devices or new software gateways), one of the software gateways 118-136 (either a new gateway or an existing gateway) can be configured to send an indication of the new device to the ledger monitor service 116. Based on the indication, the ledger monitor service 116 can share a load the software gateways at a particular building (e.g., share the load between the software gateway 126 and the software gateway 128 within the building 106).

The software gateways within a group can be configured check the status of each other via peer-to-peer (P2P) communication. The P2P communication status checking can be performed by the software gateways 118-136 in response to receiving a command from the ledger monitor service 116. For example, the ledger monitor service 116 may fail communicating with the software gateway 126. The ledger monitor service 116 can cause the software gateway 128 to communicate with the software gateway 126 via P2P to check the status of the software gateway 126. The software gateway 128 can return a result of the communication (e.g., whether or not the software gateway 126 responded to the software gateway 128) to the ledger monitor service 116. In various embodiments, the P2P communication can be performed via any communication medium (e.g., wired or wireless medium) and/or protocol supported between the software gateways, such as via a local area network (LAN) connection between the gateways.

Figure 2:
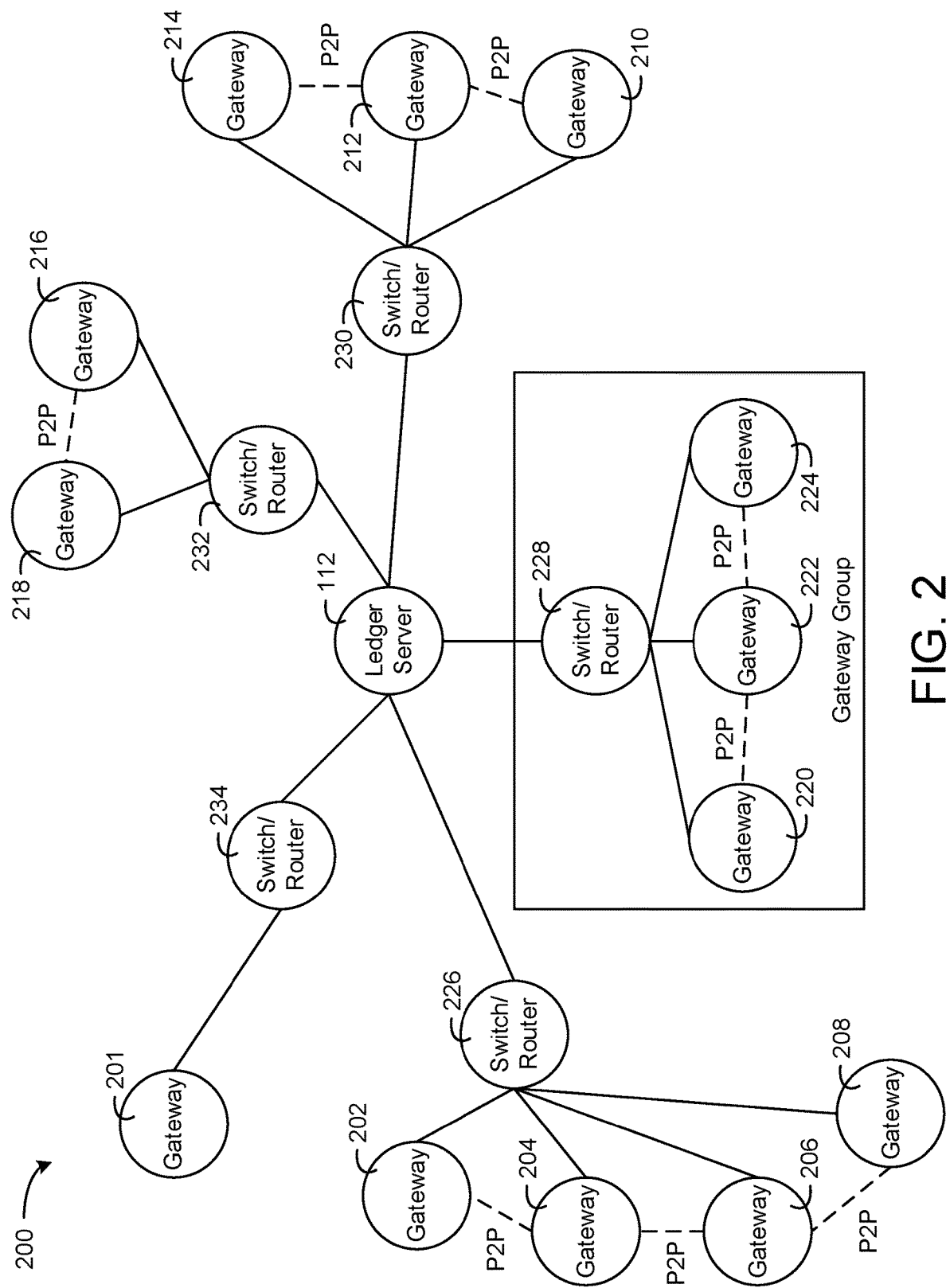
FIG. 2 is a block diagram of communication links of the system of FIG. 1 and logical groupings of the software gateways, according to an exemplary embodiment.

Referring now to FIG. 2, a system 200 of communication links and logical groupings of the software gateways is shown, according to an exemplary embodiment. The gateways 201-224 can be software gateways that are the same as, or similar to, the software gateways 118-136 as described with reference to FIG. 1. Each of the gateways 201-224 can communicate with the ledger server 112 via one or more switches or routers, i.e., the switch/router elements 226-234. The gateways 201-224 can be grouped according to an identifier, a customer group identifier. For example, the gateways 220, 222, and 224 may be gateways of a particular customer group identifier. Gateways associated with the same customer group identifier can be configured to facilitate failover or load sharing with other gateways associated with the customer group identifier.

The ledger server 112 can store a hierarchy of identifiers. The identifiers can include a customer identifier, a customer group identifier, and a gateway identifier. The customer identifier can be a particular entity, such as a retail chain, a retail chain operator, a homeowner, a building owner, etc. The customer identifiers can each be associated with one or multiple customer group identifiers. For example, building owner may have one customer group identifier for the building of the building owner. However, a retail chain entity may have multiple customer group identifiers, one customer group identifier for each of multiple stores of the retail chain entity. Each gateway may be associated with a gateway identifier. Each gateway identifier can be assigned one or multiple building devices to collect data from. Each gateway can include a customer group identifier.

Figure 3:
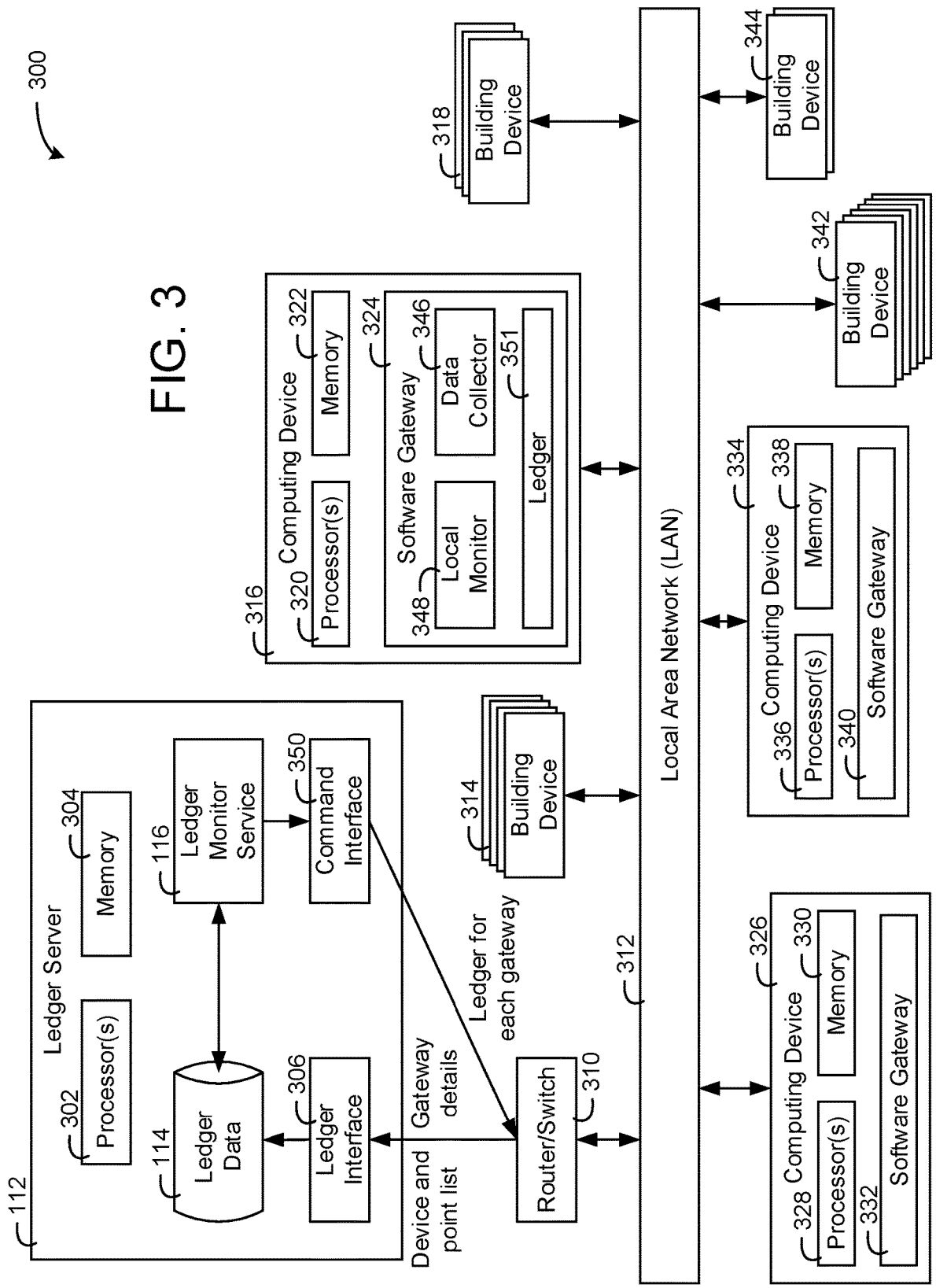
FIG. 3 is a block diagram of a system including software gateways and the distributed ledger server, according to an exemplary embodiment.

Referring now to FIG. 3, a system 300 including software gateways and the distributed ledger server 112 are shown in greater detail, according to an exemplary embodiment. The system 300 includes a LAN 312. The LAN 312 may be local within a particular building. Various building devices 314, 318, 342, and 344 can communicate via the LAN 312. Furthermore, devices hosting software gateways, computing devices 316, 326, and 334 can communicate via the LAN. Software gateways of the computing devices 316, 326, and 334, i.e., software gateway 324, software gateway 332, and software gateway 340 can communicate with the building devices 314, 318, 344, and 342 via the LAN 312 (southbound communication). Furthermore, the software gateways 324, 332, and 340 can communicate peer to peer via the LAN 312. The software gateways 324, 332, and 340 can further communicate with the ledger server 112 via the LAN 312 and a router/switch 310 (or furthermore the Internet), i.e., northbound communication.

The ledger server 112 includes processor(s) 302 and memory 304. The processor 302 can be general purpose processor, an application specific integrated circuit (ASIC), one or more field programmable gate arrays (FPGAs), a group of processing components, or other suitable electronic processing components. The processor 302 can be communicatively coupled to the memory 304.

The memory 304 can include one or more devices (e.g., memory units, memory devices, storage devices, etc.) for storing data and/or computer code for completing and/or facilitating the various processes described in the present disclosure. The memory 304 can include random access memory (RAM), read-only memory (ROM), hard drive storage, temporary storage, non-volatile memory, flash memory, optical memory, or any other suitable memory for storing software objects and/or computer instructions. The memory 304 can include database components, object code components, script components, or any other type of information structure for supporting the various activities and information structures described in the present disclosure. The memory 304 can be communicably connected to the processor via the processing circuit and can include computer code for executing (e.g., by the processor 302) one or more processes described herein.

The ledger server 112 includes a ledger interface 306 and a command interface 350. The interfaces 306 and 350 can be application programming interfaces (APIs). The ledger interface 306 can receive and/or aggregate information received from software gateways of the system 300, e.g., software gateway 332, software gateway 340, and/or the software gateway 324. The ledger interface 306 can store the information as the ledger data 114. For example, indications of the building device 314, 318, 344, and/or 342 along with indications of the points of each piece of equipment can be identified by the software gateways 332, 340, and/or 324 and ingested into the ledger data 114 via the ledger interface 306. The command interface 350 can allow the ledger monitor service 116 to distribute a ledger file to each of the software gateways 332, 340, and/or 324, e.g., the ledger 351.

The system 300 includes computing devices 316, 326, and 334. The computing devices 316, 326, and/or 334 can be general purpose computing devices or specific purpose computing devices. For example, the computing devices 316, 326, and/or 334 can be desktop computers, laptop computers, server computers, cell phones, gateway boxes, etc. Each of the computing devices 316, 326, and 334 can include processor(s) and memory for implementing one of the software gateways 332, 340, and/or 324. The processor and/or memory, i.e., processor(s) 320, 336, and 328 and memory 322, 338, and 330 can be similar to or the same as the processor(s) 302 and the memory 304.

The software gateway 324 is shown to include a local monitor 348, a data collector 346, and a ledger 351. The data collector 346 can be configured to subscribe to points and/or poll points of the various building devices 314, 318, 344, and/or 342. The local monitor 348 can monitor status, configuration, specifications of the software gateway 324 or the software gateways 332 and/or 340 and communicate the data to the ledger interface 306.

Each of the other software gateways 332 and 340 may have similar components. When the software gateway 324 is started up, the software gateway 324 can perform a start-up operation. The software gateway 324 may be provisioned to display, via a user interface, a text box allowing a user to enter a customer group identifier. In some embodiments, during a gateway setup phase during provisioning and/or manufacturing, a customer group identifier can be added to the software gateway 324.

The software gateway 324 can be configured to get specification information (memory, space available, processing power, etc.) for the software gateway 324, e.g., determine the specification information of the computing device 316. The software gateway 324 can retrieve a gateway identifier or identifier of the computing device 316 and assign the identifier as a heartbeat identifier for heartbeat messages that the computing device 316 can send to the ledger server 112 to confirm that the software gateway 324 is operating. In some embodiments, a user provides a heartbeat interval to the software gateway 324. The heartbeat interval may indicate an interval at which the software gateway 324 sends a heartbeat message to the ledger server 112.

Once the metadata of the software gateway 324 (e.g., specification information, customer group identifier, heartbeat identifier, heartbeat interval, etc.) has been entered and/or saved by the software gateway 324, the software gateway can post the metadata to the ledger interface 306. The ledger interface 306 can store the metadata in the ledger data 114. The metadata can include a gateway identifier, a customer group identifier, a gateway status indication, and gateway specifications, (e.g., system type, available physical memory, available virtual memory, network speed, etc.).

The software gateway 324 can send, at a heartbeat interval, a heartbeat message and/or collected timeseries samples to the ledger server 112. The data collector 346 of the software gateway 324 can, either automatically or upon user request, fetch an indication of all devices and points available on the LAN 312, convert the data into a JSON format, and/or post the data to the ledger server 112. The software gateway 324 can generate an interface allowing a user to provide an indication of which points of the LAN 312 require subscription and/or polling. The software gateway 324 can post an indication of which points require subscription and/or polling to the ledger interface 306.

In response to receiving a command from the ledger monitor service 116, local monitor 348 can be configured to communicate with another software gateway within a group. The command can indicate the software gateway to be communicated with. The local monitor 348 can communicate with the software gateway to determine whether the software gateway is operational.

If the software gateway 324 fails to communicate with the ledger server 12, i.e., cloud communication or north bound communication has failed, the local monitor 348 can send a message to other gateways in the group that it is still able to read data from southbound devices but has issues with northbound communication. The other gateways associated with the customer group identifier can be identified from the ledger 351. This ensures that the software gateway 324 will continue to save the data for a pre-determined period until connectivity to the cloud is restored. The local monitor 348 can store and/or retrieve from the ledger 351, a list of gateway devices associated with the customer group identifier, encrypted credentials of the gateway devices, and/or indications of the gateway devices in the group and/or the status of each gateway device in the group.

In some embodiments, the local monitor 348 may have two primary assignments, to monitor and ensure the software gateway 324 and/or agents of the software gateway 324 are running and to send and/or receive status messages with other gateways that the software gateway 324 is configured to communicate with.

During a boot-up of the software gateway 324, the local monitor 348 can be started. As part of the startup process, the local monitor 348 can have credentials of other peer software gateways in the customer group entered along with an indication of a check-in interval, an interval at which to check in with the other peer software gateway. The local monitor 348 can regularly determine which software gateways are running, which northbound or south bound agents are running (e.g., software agents configured to either push data to the ledger server 112 or collect data from building devices) and log the result of the determinations. If any of the agents are not functioning properly, the local monitor 348 can attempt to reboot the agent. If the agent fails to reboot or fails to perform after being rebooted, the local monitor 348 can record an indication of the agent failure.

If any of the software gateway is not operating properly, the local monitor 348 can send a status of itself to the ledger server 112. Furthermore, the local monitor 348 can regularly check in with the other software gateways communicating via the LAN 312 and get the status of each of the software gateways and any failed statuses. In some embodiments, the ledger monitor service 116 may send a request to the local monitor 348 for a status of another software gateway on the LAN 312. The ledger monitor service 116 can respond the status of any of the peer software gateway. In some embodiments, the ledger monitor service 116 can provide an already stored status to the ledger monitor service 116 in response to the request and/or can communicate with the peer software gateway and provide a result of the communication to the ledger monitor service 116. The local monitor 348 can store and/or determine various parameters, the parameters may include a list of gateways including peer gateway identifiers, peer gateway Internet Protocol (IP) addresses, peer gateway usernames, peer gateway passwords, peer gateway statuses, a self-status, peer gateway agent statuses, a self agent status, a peer gateway check-in interval, a self check-in interval, etc.

The ledger monitor service 116 can get the list of points within the customer group identifier, get the list of gateways in the group by its status and get its metadata including specification. Based on each gateway and the specification of each gateway, the ledger monitor service 116 can run an algorithm and assign a score to each gateway device. Based on the score, the ledger monitor service 116 determines and assigns points and/or creates a ledger file indicating the point assignments. The ledger monitor service 116 can be configured to push the ledger file to the software gateways 332, 340, and/or 324. Based on the number of points and the number of software gateways communication in the LAN 312 and the scoring algorithm, the ledger monitor service 116 can determine some devices to be "back-ups." Back-ups are devices configured to store a ledger indicating all the metadata data. However, back-ups may not have any points assigned to the them to collect data from. Once each of the software gateways 332, 324, and/or 340 receives the ledger file, the software gateway will subscribe/poll to the points assigned to it through the file.

If a new gateway has been introduced to the LAN 312 and detected in the network through the customer group identifier, the ledger monitor service 116 can be configured to retrieve the metadata of the new gateway, run the score algorithm on the metadata, and assign points to the new gateway and remove points from existing gateways. In some embodiments, the ledger monitor service 116 assigns the new gateway as a back-up gateway devices if the ledger monitor service 116 determines that the software gateways 332, 324, and 340 are already performing efficiently in a customer group and no adjustment of points is needed. The ledger server 112 can distribute a new updated ledger indicating the new point assignments.

The ledger monitor service 116 can be configured to check the status of each of the software gateways 332, 340, and/or 324 at a regular interval. If one of the software gateways 332, 340, and/or 324 has stopped communicating with the ledger server 112, based on the score of each gateway in the group, the ledger monitor service 116 can be configured to split and share the point list of the failed gateway based on the scores of the active gateways and send an updated ledger file to the software gateways 332, 340, and/or 324 including updated list of points. The software gateways 332, 340, and/or 324 can read data from the updated list of points indicated by the updated ledger file.

The ledger monitor service 116 can generate a ledger for each customer group identifier. The ledger can include a list of gateways associated with the customer group identifier and metadata for each gateway of the list. For example, the metadata can include a specification for the gateway, a signal strength for the gateway (calculated by the ledger monitor service 116 with a heartbeat identifier of gateway), an attribute score, and/or a type of the gateway (e.g., primary, secondary, back-up). The ledger monitor service 116 can further include a list of building devices and the points associated with the building device in the particular customer group identifier. The ledger can further include an indication of the points to be subscribed to and/or polled for each gateway in the customer group identifier. The ledger file can include an indication of each gateway in the customer group identifier along with a status of each gateway.

The ledger monitor service 116 can perform multiple get commands to get data from the ledger interface 306, e.g., data stored in the ledger data 114. The gets can include getting a customer group identifier. The gets can include getting gateways and the specifications of the gateways for a particular customer group identifier. The gets can include getting a heartbeat identifier for each of the gateways. The gets can include getting a list of all building devices associated with a particular customer group identifier. The gets can include getting a list of points for subscription and/or polling associated with the customer group identifier. Furthermore, the gets can include getting the status of a non-communicative gateway from a communicative gateway.

The ledger monitor service 116 can be configured to perform a set of processes. The processes can including calculating a score for each gateway based on the specifications of the gateway. The processes can include a process of determining how many points each gateway should subscribe to and/or poll for each customer group identifier. The processes can include a process of generating a gateway ledger file for each gateway. The processes can include a process of periodically calculating and monitoring a status of each gateway by a heartbeat identifier of the gateway and calculating a signal strength for each gateway.

If any of the gateways has a weak or poor signal strength or has lost signal, determined by the ledger monitor service 116, based on the gateway and its score within the customer group, the ledge monitor service 116 can be configured share the points assigned to the bad gateway across other active gateways by generating an updated gateway ledger file with new point assignments for the existing gateways, the new point assignment reassigning the points of the failed gateway to an operating gateway.

In some embodiments, if a gateway is determined by the ledger monitor service 116 to be non-responsive based on no signal received, the ledger monitor service 116 can mark the gateway device for a reboot. If an old gateway comes online or a new gateway is added to the customer group identifier, the ledger monitor service 116 can be configured to send an updated gateway ledger file to each gateway in the group with updated gateway list and status and point to which each gateway should subscribe/poll, the point assignments taking into account the gateway that has returned to being online and allocating some of the point assignments to the gateway that has returned to being online. In some embodiments, instead of assigning points to the gateway, the ledger monitor service 116 can assign the gateway that has returned to be online as a back-up gateway.

The ledger monitor service 116 can be configured to perform posts via the command interface 350. The posts can include posting a gateway ledger to each gateway in a customer group identifier, where the gateway ledger is generated for the customer group identifier. The posts can include posting a command to a communicative gateway to get the status of a non-responsive gateway in the group. In some embodiments, the ledger that the ledger monitor service 116 generates and posts includes a customer group identifier, a list of gateways in the customer group identifier, a score for each gateway, a status for each gateway (a signal strength calculated by the ledger monitor service 116 from heartbeat identifier messages), a gateway backup assignment, a list of building devices and points associated with the customer group identifier, and a list of points to be subscribed to and/or polled for each gateway associated with the customer group identifier.

The ledger monitor service 116 can retrieve and/or determine data for generating the ledger. The data can include a customer group identifier, a list of gateways assigned to each customer group identifier, a specification for each gateway, a signal strength for each gateway, a score for each gateway, an assignment for each gateway (e.g., assigned as primary, secondary, backup, etc.), a list of building devices and points for each customer group identifier, a list of points subscribed/polled by each gateway per customer group identifier, and/or a log of all the above transaction with the gateway.

The ledger monitor service 116 can be configured to communicate with the software gateways 332, 324, and/or 340. The ledger monitor service 116 can be configured to use a command/messaging service to send gateway ledger files to the various gateway devices listening for messages. For example, the gateways may listen to an IoT Hub (e.g., a Microsoft Azure IoT Hub) using Advanced Message Queuing Protocol (AMQP) and/or MQ Telemetry Transport (MQTT) protocol. When the ledger monitor service 116 sends the gateway ledger file to the IoT Hub, the listening gateway can be configured to download a file assigned to the gateway. Based on the information in the ledger, the gateway can be configured to take the appropriate action, i.e., storing and updating the local database, subscribing/polling or unsubscribing to the points assigned to it by the ledger monitor service 116.

In some embodiments, the ledger monitor service 116 can generate a gateway score for each of the software gateways 324, 332, and 340. The score can be generated for each gateway based on the specifications of the gateway and the ability of the gateway to handle multiple building devices and points. When the software gateways 324, 332, and/or 340 are turned on, the software gateways 324, 332, and/or 340 will get the specifications of the hardware or virtual machine information on which the software gateways 324, 332, and/or 340 are deployed and post the specification information to the ledger monitor service 116.

The specification information can include processor data. The processor data may determine the speed at which points can be subscribed to by one of the software gateways 324, 332, and/or 340. The specification information can include a clock speed. The clock speed can indicate how much data and points can be processed by one of the software gateways 324, 332, and/or 340. The specification information can include available RAM. The RAM determines how many points can be subscribed to by one of the software gateways 324, 332, and/or 340. The specification information can include available hard disk space. The available hard disk space can indicate how many point worth of data can be stored by one of the software gateways 324, 332, and/or 340. The specification information can include LAN speed. The LAN speed can indicate the speed at which one of the software gateways 324, 332, and/or 340 can retrieve data from a point. The specification information can further indicate Internet speed. The Internet speed may determine the speed in which data can be posted to the ledger server 112 and/or another cloud platform by one of the software gateways 324, 332, and/or 340.

Each of the aforementioned specification parameters can have a weightage assigned to it. Based on the weightages and the specification parameter values for the software gateways 324, 332, and/or 340, ledger monitor service 116 can generate a score for the software gateways 324, 332, and/or 340. The score can determine the ability of the software gateways 324, 332, and/or 340 to handle data.

In an implementation, a score of less than 1 can mean that a physical computing device is not ideal to handle the a software gateway at all. A score between 1 and 1.5 can indicate that the software gateway can handle less than 1,000 points. A score between 1.5 and 2.5 can mean that the software gateway can handle greater than 1,000 points but less than 10,000 points. A score greater than 2.5 may indicate that the gateway can handle greater than 10,000 points. Based on the scores that the ledger monitor service 116, the ledger monitor service 116 can share point assignments across software gateways of a customer group identifier. The scores shown and described herein are illustrative; different numerical or non-numerical scores/weightages could be utilized, and such modifications are contemplated within the scope of the present disclosure.

Figure 4:
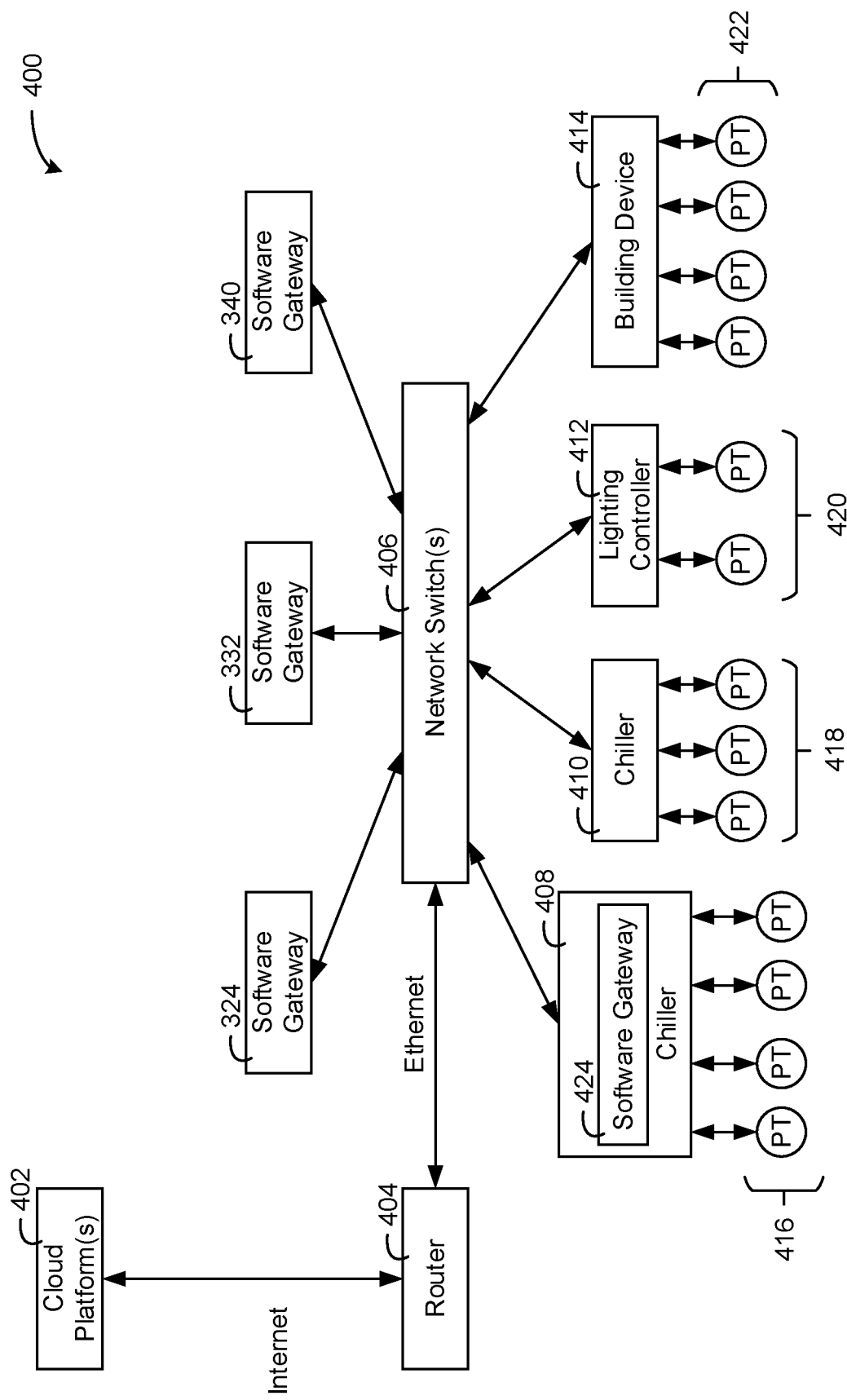
FIG. 4 is a block diagram of a system including software gateways and communication networks, according to an exemplary embodiment.

Referring now to FIG. 4, a system 400 including software gateways and communication networks, according to an exemplary embodiment. The system 400 includes the software gateways 324, 332, and 340 communicating via network switches 406. The network switches 406 can be network switches of an Ethernet based network facilitated by a router 404. The router 404 can connect the software gateways 324, 332, and/or 340 with northbound systems via the Internet, e.g., cloud platforms 402 (e.g., the ledger server 112).

In some embodiments, the network switches 406 and/or the router 404 facilitate the LAN 312. The network switches 406 can further connect the software gateways 324, 332, and/or 340 to building devices, e.g., a chiller 408, a chiller 410, a lighting controller 412, and/or a building device 414. The software gateways 324, 332, and/or 340 can subscribe to points of the building equipment and/or poll points of the building equipment. For example, the chiller 410 may have points 418 (e.g., valve position points, water temperature points, etc.), the lighting controller 412 may have points 420 (e.g., occupancy sensor values, light switch position, light on/off status, etc.), and/or the building device 414 may have points 422. The software gateways 324, 332, and/or 340 can be assigned various points of the points 418-422 and can subscribe to and/or poll the points via the network switches 406. The chiller 408 may have points 416. However, the chiller 408 may include a software gateway 424 which can subscribe to and/or poll the points 416 and communicate northbound to the cloud platform 402 via the network switches 406 and/or the router 404. The points can be actuator feedback points, sensor value points, virtual points calculated by the building equipment, operational setpoints, operational settings, etc.

Figure 5:
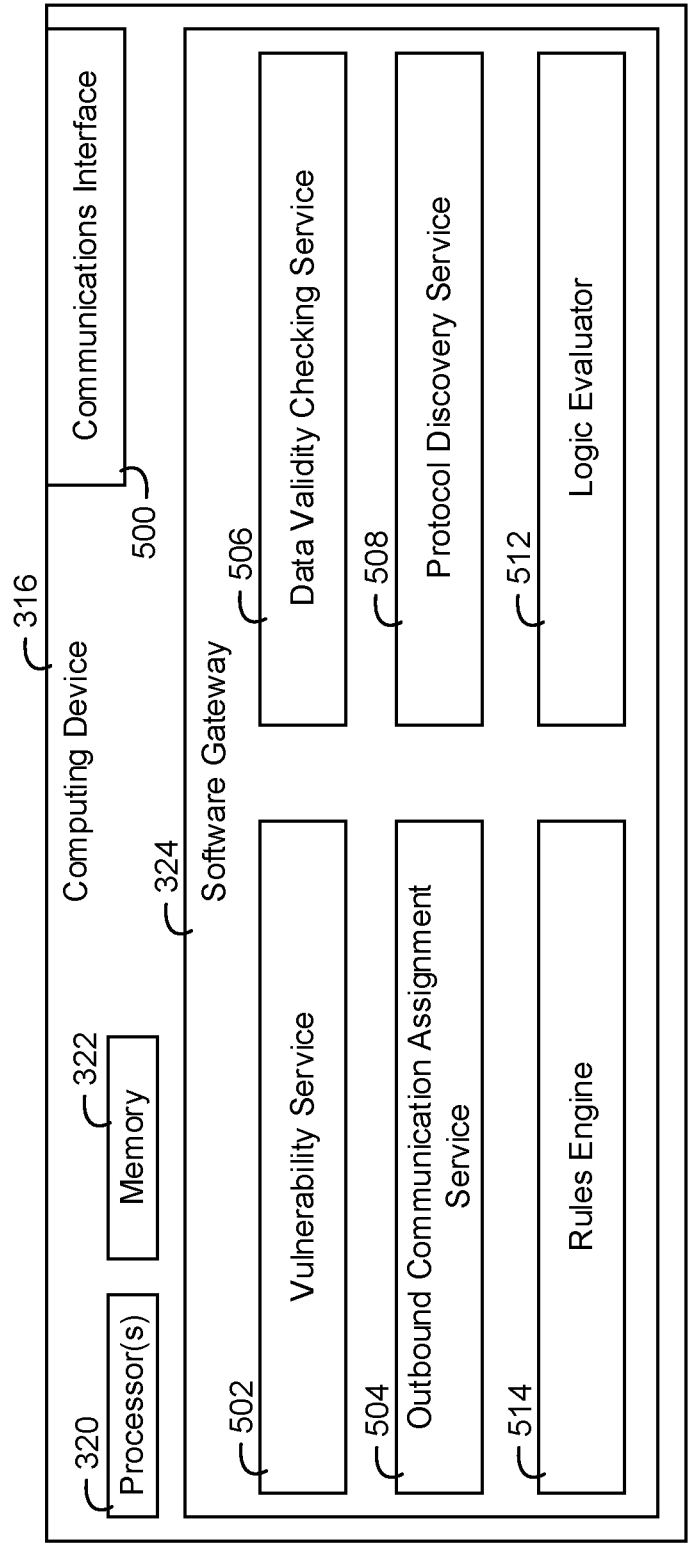
FIG. 5 is a block diagram of a computing device implementing a software gateway, according to an exemplary embodiment.

Referring now to FIG. 5, the computing device 316 is shown in greater detail, according to an exemplary embodiment. The computing device 316 is shown to include the processor 320 and the memory 322. Furthermore, the computing device 316 is shown to include a communications interface 500. The communications interface 500 can facilitate communicate between the computing device 316 and the LAN 312, and/or the router/switch 310.

The communications interface 500 can be or include wired or wireless communications interfaces (e.g., jacks, antennas, transmitters, receivers, transceivers, wire terminals, etc.) for conducting data communications between the computing device 316, the LAN 312, and/or the router/switch 310 or other external systems or devices. In various embodiments, communications via communications interface 500 can be direct (e.g., local wired or wireless communications) or via a communications network (e.g., a WAN, the Internet, a cellular network, etc.). For example, the communications interface 500 can include an Ethernet card and/or port for sending and receiving data via an Ethernet-based communications link or network. In another example, the communications interface 500 can include a Wi-Fi transceiver for communicating via a wireless communications network. In another example, the communications interface 500 can include cellular or mobile phone communications transceivers.

The software gateway 324 includes multiple services. The services can include a vulnerability service 502, an outbound communication assignment service 504, a data validity checking service 506, a protocol discovery service 508, a logic evaluator 512, and a rules engine 514. The service 502 can be configured to facilitate validation of firmware, libraries, and/or related software of the software gateway 324 against known vulnerabilities and upgrade the software gateway 324 to stable and secure software. As part of a startup sequence of the software gateway 324, the service 502 can be configured to get the versions of all the software installed on the software gateway 324, including the operating system and post it to a cloud vulnerability repository service (e.g., a cloud service running on the cloud platform 402) as metadata describing the software gateway 324.

The metadata information can include a gateway identifier, a python version of the software gateway, indications of gateway libraries used by the software gateway 324, versions of the gateway libraries, an indication of a PostGre database of the software gateway, a version of the PostGre database, an indication of Ubuntu used by the software gateway 324, a version of the Ubuntu, and/or an indication of the firmware version(s) of the software gateway 324. The cloud vulnerability repository service can receive the metadata from the service 502. The cloud vulnerability repository service can identify vulnerabilities of the software and/or firmware of the software gateway 324 based on the metadata. The cloud vulnerability repository service can continuously update a database repository indicating what software versions are associated with vulnerabilities. The cloud vulnerability repository service can continuously update the database by subscribing to auto updates from a vulnerability database platform and/or by receiving manual updates from a user. Examples of data stored in the database repository are shown in Table 1 below.

TABLE 1

Repository Database

| Python | POSTGRE DB |
|---|---|
| Latest Stable Versions: 2.7, 3.5 | Latest Stable Versions: 11 |
| Vulnerabilities last Identified in: 2.7 | Vulnerabilities last Identified in: 11 |
| Identified Data: Dec. 14, 2018 | Identified Data: Jan. 1, 2019 |
| Priority: Critical | Priority: Critical |
| Fix: 2.7.1 | Fix: 11.1 |
| Fix Release Date: Dec. 15, 2018 | Fix Release Date: Feb. 1, 2019 |
| Download URL: www.python.com/2.7.1/windows/32bit/download | Download URL: www.postgre.com/windows//download |
| Upgrade Approved by entity: YES | Upgrade Approved by entity: NO |

In some embodiments, the metadata describing software of the software gateway 324 is posted by the service 502 to the ledger monitor service 116. The ledger monitor service 116 can be configured to, at a regular interval, verify the information posted by each of multiple software gateways against an internal vulnerability database, e.g., the same or different as the vulnerability repository database described above and illustrated in Table 1. If version identifiers of the metadata matches with the identified vulnerabilities and the "upgrade approved by entity" parameter is set to "YES," the ledger monitor service 116 can send an upgrade (or upgrade message command causing the software gateway 324 to retrieve the upgrade) to the software gateway 324. Once the software gateway 324 is upgraded, the service 502 can determine the software metadata and post the software metadata to the ledge monitor service 116.

The outbound communication assignment service 504 can be configured to dynamically assign and/or optimize outbound communication between the software gateway 324 and the cloud platforms 402 and/or the ledger server 112. The software gateway 324 can be configured to support multiple mechanisms of sending outbound communication. During configuration, the software gateway 324 can be configured to include an indication of a primary communication mechanism, a secondary communication mechanism, and a tertiary communication mechanism. The primary communication mechanisms may be Ethernet, while the secondary communication mechanism may Wi-Fi. The tertiary communication mechanism may be cellular. The service 504 can cause the software gateway 324 to utilize the primary, secondary, and tertiary communication mechanisms to ensure optimum usage of outbound communication mechanisms and/or to save money for a customer where one or more of the secondary or tertiary communication mechanisms may be associated with usage fees. While Ethernet, Wi-Fi, and cellular communications media are provided for example, it should be understood that any types of communications media could be utilized. For example, in some embodiments, a 4G or 5G connection could be utilized, short-range wireless communications media such as Bluetooth could be utilized, etc.

The service 504 can be configured to store a re-try interval. The interval may be fifteen minutes. If the software gateway 324 attempts to send data via the secondary or tertiary communication mechanisms but fails, the software gateway 324 may retry sending the data until the re-try interval passes. In response to the re-try interval passing, the service 504 can cause the software gateway 324 to communicate the data via the primary mechanism.

In some embodiments, the ledger monitor service 116 can send a confirmation message to the software gateway 324 indicating that the connection between the ledger monitor service 116 and the software gateway 324 is operational. In some embodiments, the confirmation message is sent by the ledger monitor service 116 to the software gateway 324 in response to the software gateway 324 sending a heartbeat message to the ledger monitor service 116. The confirmation message may be a "200 OK" message.

The service 504 can determine that the connection between the software gateway 324 and the ledger monitor service 116 has failed via the primary communication mechanism in response to not receiving the confirmation message for a predefined amount of time in response to sending heartbeat message via the primary communication mechanism. The service 504 can cause the software gateway 324 to communicate via the secondary communication mechanism and send heartbeat messages to the ledger monitor service 116 via to the secondary communication mechanism in response to the predefined amount of time passing without receiving a confirmation message in response to sending heartbeat messages via the primary communication mechanism.

The service 504 can be configured to determine whether any confirmation response is received in response to sending heartbeat messages via the secondary communication mechanism. If no confirmation response is received via a predefined amount of time, the service 504 can cause the software gateway 324 to switch to the tertiary communication mechanism. The software gateway 324 can proceed with sending heartbeat messages to the ledger monitor service 116 via the tertiary communication mechanism. If the software gateway 324 does receive a confirmation via the secondary communication mechanism or the tertiary communication mechanism, the software gateway 324 can remain communicating on either the secondary communication mechanism or the tertiary communication mechanism.

While communicating on either the secondary communication mechanism or the tertiary communication mechanism for a period of time (e.g., receiving at least a predefined number of confirmation messages), the service 504 can cause the software gateway 324 to switch to communicate via the primary communication mechanism and can send heartbeat messages via the primary communication mechanism. If the software gateway 324 receives a confirmation message via the primary communication mechanism, the service 504 can cause the software gateway 324 to remain communicating via the primary communication mechanism. If the service 504 determines that no confirmation message is received, the service 504 can cause the software gateway 24 to return to communicating via the previous communication mechanism (e.g., the secondary communication mechanism or the tertiary communication mechanism).

The service 506 can, when timeseries data is collected for individual points, verify that the timeseries data is valid and correct. The service 506 can cause only valid data to be posted to the cloud platforms 402 and/or the ledger server 112 ensuring only clean data is sent to the cloud, in some embodiments. The service 506 can store a maximum value, a minimum value, and a unit for each point that the software gateway 324 collects data from. In some embodiments, the maximum value, the minimum value, and the unit is received from the building equipment of the point. In some embodiments, a user can input the maximum value, the minimum value, and the unit into the service 506. The service 506 can verify that the data collected for a point does not exceed an associated maximum value or fall below the minimum value.

The service 506 can add reliability values to collected timeseries data for a point. For example, the service 506 could add a reliability indicator for each data sample of a timeseries based on whether the value of the data sample is within the maximum and minimum values. In some embodiments, the building device provides the reliability value to the service 506. For samples that do not have a reliability associated with it, once the timeseries data is ingested and brought into the software gateway 324, the service 506 can check values of the timeseries against the metadata information of the point (e.g., maximum value, minimum value, etc.). If there is a deviation in the value from the maximum value and/or the minimum value, the timeseries sample will be appended with the reliability value (or a reliability for every data point) and posted to the cloud.

In some embodiments, service 506 can be configured to re-fetch data if there is a reliability issue with continuous samples. For example, if the service 506 detects that a sample is unreliable, this may be caused by network corruption. The service 506 can retrieve the sample a second time in response to detecting the sample to be unreliable. In some embodiments, the service 506 is configured to create a work order or send a notification to user device(s) of appropriate individuals in response to determining that a data sample or data samples of a data point are unreliable.

The protocol discovery service 508 can be configured to automatically discover the building devices and points of different protocols connected to the software gateway 324, for example, BACNET, MODBUS, OPCUA, etc. The service 508 is configured to sequentially query and get the building device and system information from all of the communication protocols. The service 508 may store a configuration file that identifies the various protocols that the service 508 is configured to retrieve information about (e.g., a list of protocols to sequentially query).

For example, the software gateway 324 may have the ability to communicate southbound via BACNET, MODBUS, OPCUA, and/or ADXSQL. Either automatically or in response to receiving a user command, the service 508 can broadcast a "WHOIS" message to the LAN 312 to get information about all the BACNET building devices on the LAN 312 and the points associated with the building devices. The "WHOIS" message may be a prompt for the building devices to respond with information describing their points and communication protocols. After sending the WHOIS message, the service 508 may wait a predefined amount of time (e.g., a few seconds).

The service 508 can retrieve a list of all OPCUA nodes from a server and the end points of the server by communicating on the LAN 312. After retrieving the list, the service 508 can wait for a predefined amount of time (e.g., a few seconds). The service 508 can retrieve a list of all MODBUS TCP devices by performing a broadcast on LAN 312. After retrieving the list of MODBUS TCP devices, the service 508 waits for a predefined amount of time (e.g., a few seconds). The service 508 can continue to check any other protocols on the LAN 312. If an ADX device already exists in on the network, the software gateway 324 can be configured to read data from the SQL database with the different protocols and then use that information to connect to the various southbound protocols directly to retrieve the data.

The rules engine 514 can be configured to perform self-governing capabilities for the software gateway 324. Any operational rules for the software gateway 324 that are set in the ledger server 112 and/or the cloud platforms 402 can be pushed down to the rules engine 514 (e.g., to all gateways in a customer group identifier). This will ensure that during communication black-outs with the cloud, the software gateway 324 can still be able to perform operations. The operations can include changing, by the rules engine 514, setpoint temperature of a room per per-determined schedule. The operations can include turning, by the rules engine 514, lights on or off per pre-determined schedule, the operations can include, adjusting, by the rules engine 514, temperature setpoints of a thermostat based on outdoor weather.

The logic evaluator 512 can be configured to determine computing resources of the computing device 316. The computing device 316 may implement the software gateway 324 (or components of the software gateway 324) on a virtual machine. The logic evaluator 512 can be configured to allow the computing device 316 to allocate a particular amount of computing resources to the virtual machine of the software gateway 324. In some embodiments, the logic evaluator 512 identifies, based on a number of points, types of agents that need to be run by the software gateway 324, and/or computing jobs of the software gateway 324, what level of computing resources are necessary for the software gateway 324. In some embodiments, the allocation can be performed by the ledger server 112. In this regard, the logic evaluator 512 can receive an indication of computational requirements from the ledger server 112 and can cause the computing device 316 to supply the level of computational requirements to the software gateway 324.

In some embodiments, the logic evaluator 512 can track the utilization of a virtual machine running the software gateway 324, for example, a percentage of total utilization (e.g., allocation memory utilization, allocated processing utilization, etc.). If the logic evaluator determines that the utilization is greater than a predefined amount, the logic evaluator 512 can cause additional hardware resources to be allocated to the software gateway 324 and/or generate an indication to upgrade the physical hardware requirements of the computing device 316. Such an indication can be served by the software gateway 324 to a user device.

Figure 6:
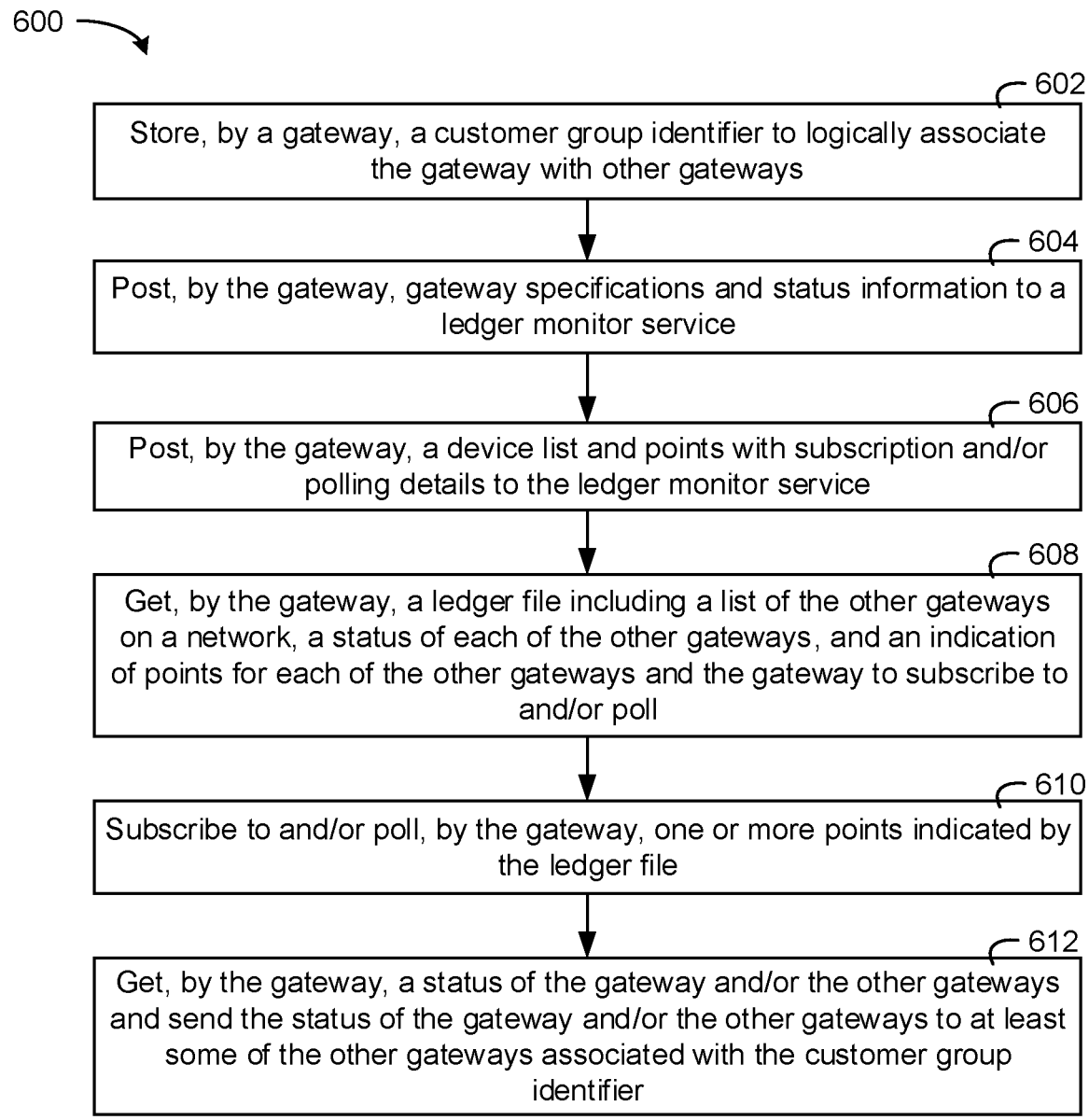
FIG. 6 is a flow diagram of a process of communicating, by a gateway, with the distributed ledger server of FIG. 1 to maintain a distributed ledger, according to an exemplary embodiment.

Referring now to FIG. 6, a process 600 of communicating, by a software gateway, with the distributed ledger server to maintain a distributed ledger is shown, according to an exemplary embodiment. The process 600 can be performed by any of the software gateways described herein, e.g., the software gateways 118-136 as described with reference to FIG. 1, the gateways 201-224 as described with reference to FIG. 2, and/or the software gateways 324, 332, and 340 as described with reference to FIG. 3.

In some embodiments, the process 600 may be performed by a software gateway assigned as a primary gateway, i.e., steps 602-612. In some embodiments, the process 600 can be performed by a secondary gateway. The secondary gateway may support the primary gateway. The secondary gateway may perform the steps 602, 604, and 608-612. The secondary gateway may not need to perform the step 606 since the ledger monitor service 116 may receive the device list and the points from the primary gateway. Furthermore, the process 600 can be performed by a backup gateway.

The backup gateway may perform the steps 602, 604, 608, and 612. The backup gateway may not need to perform the step 606 since the ledger monitor service 116 may receive the device list and the points from the primary gateway. The backup gateway may not need to perform the step 610 since the ledger monitor service 116 may not assign the backup gateway any points to subscribe to and/or poll, i.e., the backup gateway only receives points to subscribe to and/or poll if the primary or secondary gateways fail.

In step 602, the gateway stores a customer group identifier logically associating the gateway with other gateways of a building. The customer group identifier can be provisioned into the gateway before the gateway is deployed and/or entered into the gateway when a user boots up the gateway for a first time. In step 604, the gateway posts gateway specification information and status information to the ledger monitor service 116. The gateway specification may indicate the physical computing resources that the gateway has (e.g., the machine that the gateway is running on). The resources may be processing speed, memory availability, storage availability, etc. The status information may indicate that the gateway is online, fully operational, partially operational, etc.

In step 606, the gateway posts a device list and points with subscription and/or polling details to the ledger monitor service 116. The device list may be a list of other gateways identified by the gateway. The device list may be an indication of all building devices that are on a network with the gateway that include points that need to be subscribed to and/or polled. Subscription and/or polling details indicating what gateways on the network are already assigned to subscribe to and/or poll the points can be included in the communication to the ledger monitor service 116.

In step 608, the gateway gets a ledger file from the ledger monitor service 116. The ledger file can include a list of all gateway on the network, the status of each gateway, and a point assignment for each gateway indicating what points each of the gateways are assigned to subscribe to and/or poll. The ledger file can be generated by the ledger monitor service 116 based on information received from the gateway in steps 602-606 and/or similar information received from the other gateways.

In step 610, based on the assignment of the ledger file received in the step 608, the gateway can subscribe to and/or poll the assigned points. The gateway can communicate data (e.g., timeseries data) of the various assigned points to the ledger monitor service 116 and/or the cloud platforms 402. In step 612, the gateway can get a status of each of the other gateways (and of the gateway itself). The gateway can communicate peer to peer with the other gateways. The gateway can push the status information it receives from the other gateways to the ledger monitor service 116 as well as the other gateways. The gateways that the gateway communicates with may be gateways identified by the ledger file received in the step 608, gateways associated with the customer group identifier.

Figure 7:
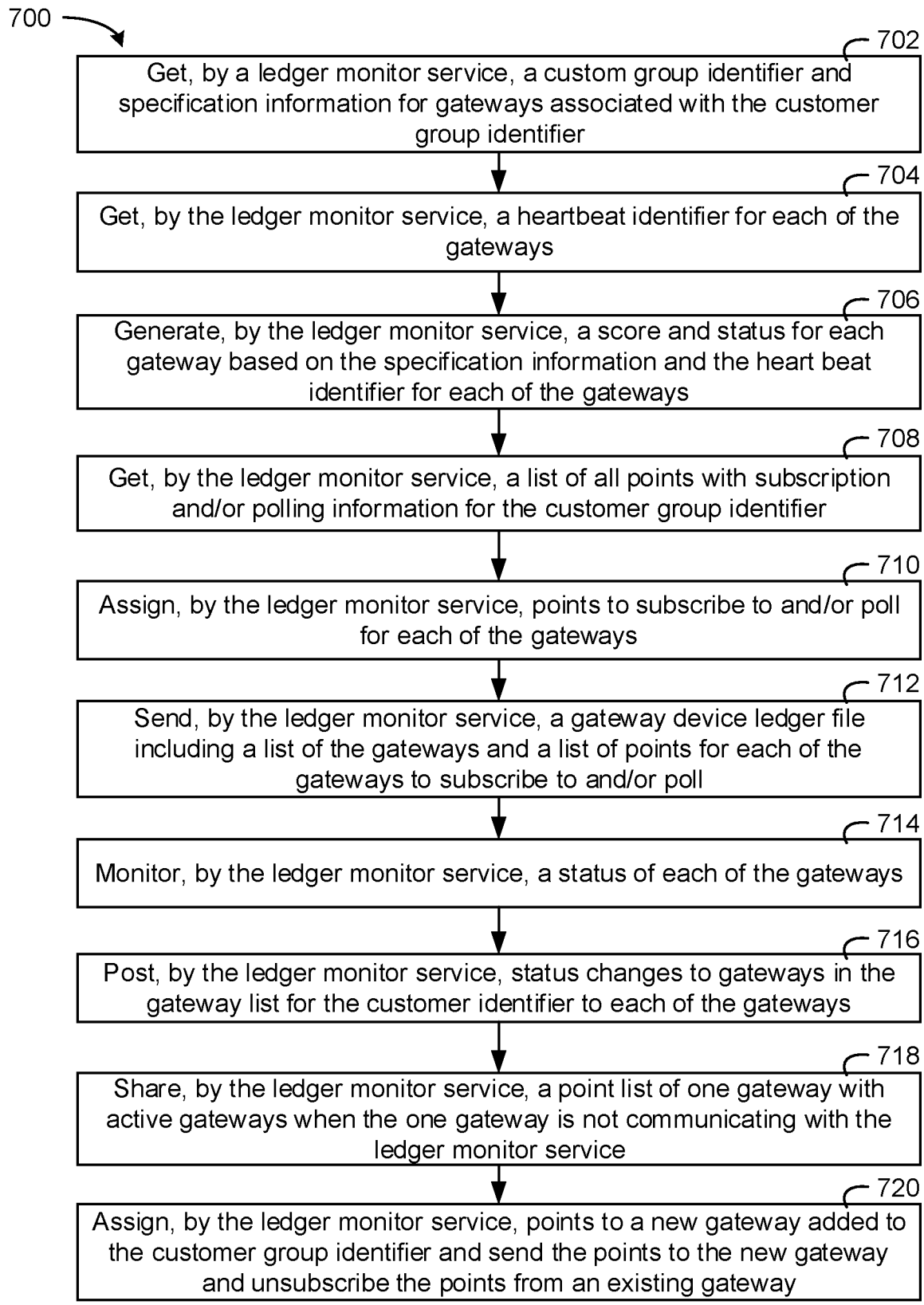
FIG. 7 is a flow diagram of a process of managing, by the distributed ledger server of FIG. 1, point assignments for the gateways, according to an exemplary embodiment.

Referring now to FIG. 7, a process 700 of managing, by the ledger monitor service 116, point assignments for gateways, according to an exemplary embodiment. The process 700 can be performed by the ledger monitor service 116 for any of the software gateways described herein, e.g., the software gateways 118-136 as described with reference to FIG. 1, the gateways 201-224 as described with reference to FIG. 2, and/or the software gateways 324, 332, and 340 as described with reference to FIG. 3.

In step 702, the ledger monitor service 116 gets a customer group identifier and specification information for gateways associated with the customer group identifier. In some embodiments, each gateway can push specification information describing the physical processing characteristics of the gateway (e.g., processing speed, memory availability, etc.) along with a customer group identifier to the ledger monitor service 116.

In step 704, the ledger monitor service 116 receives a heartbeat identifier for each of the gateways. The heartbeat identifier can uniquely identify each of the gateways and can be transmitted by the gateways to the ledger monitor service 116 at a predefined interval if the gateways are online and are operating properly.

In step 706, the ledger monitor service 116 can generate a score and status information for each gateway based on the specification information received in the step 704 and the heartbeat identifier received in the step 704 from each of the gateways. The score may be a value ranking the reliability and/or processing ability of the gateway. Gateways with a higher score may be gateways that should be assigned more points to subscribe to and/or poll.

In step 708, the ledger monitor service 116 can get a list of all points and/or existing subscription and/or polling assignments for the customer group identifier. In some embodiments, a primary gateway communicates the list of points to the ledger monitor service 116. In step 710, the ledger monitor service 116 can assign points of the list of all points received in the step 708 to each of the gateways. The assignment can be performed based on the score generated for each of the gateways in the step 706.

In step 712, the ledger monitor service 116 can send a ledger file to each of the gateways, the ledger file including a list of all of the gateways and a list of points for each of the gateways to subscribe to and/or poll. In step 714, the ledger monitor service 116 can monitor a status of each of the gateways. The ledger monitor service 116 can monitor the status based on heartbeat messages received (or not received) from the gateways. In step 716, if there are any status changes determined in the step 714 (e.g., a gateway going from online to offline or offline to online), the ledger monitor service 116 can communicate the status change to all of the gateways.

In step 718, the ledger monitor service 116 can share a point list of one gateway with active gateways when the one gateway is not communicating with the ledger monitor service 116. In some embodiments, the ledger monitor service 116 can assign the points to a new gateway via an updated ledger. In some embodiments, the existing ledger indicates a backup gateway for handling the points of the failed gateway and the backup gateway can automatically begin subscribing to and/or polling the points.

In step 720, the ledger monitor service 116 can assign points to a new gateway in response to a new gateway being added to the customer group identifier. The ledger monitor service 116 can assign points to the new gateway that are currently subscribed to an existing gateway. The point assignment update can get included within an updated ledger file generated by the ledger monitor service 116. The ledger can cause the new gateway to subscribe to and/or begin polling the points and the existing gateway to unsubscribe and/or cease polling the points.

Figure 8:
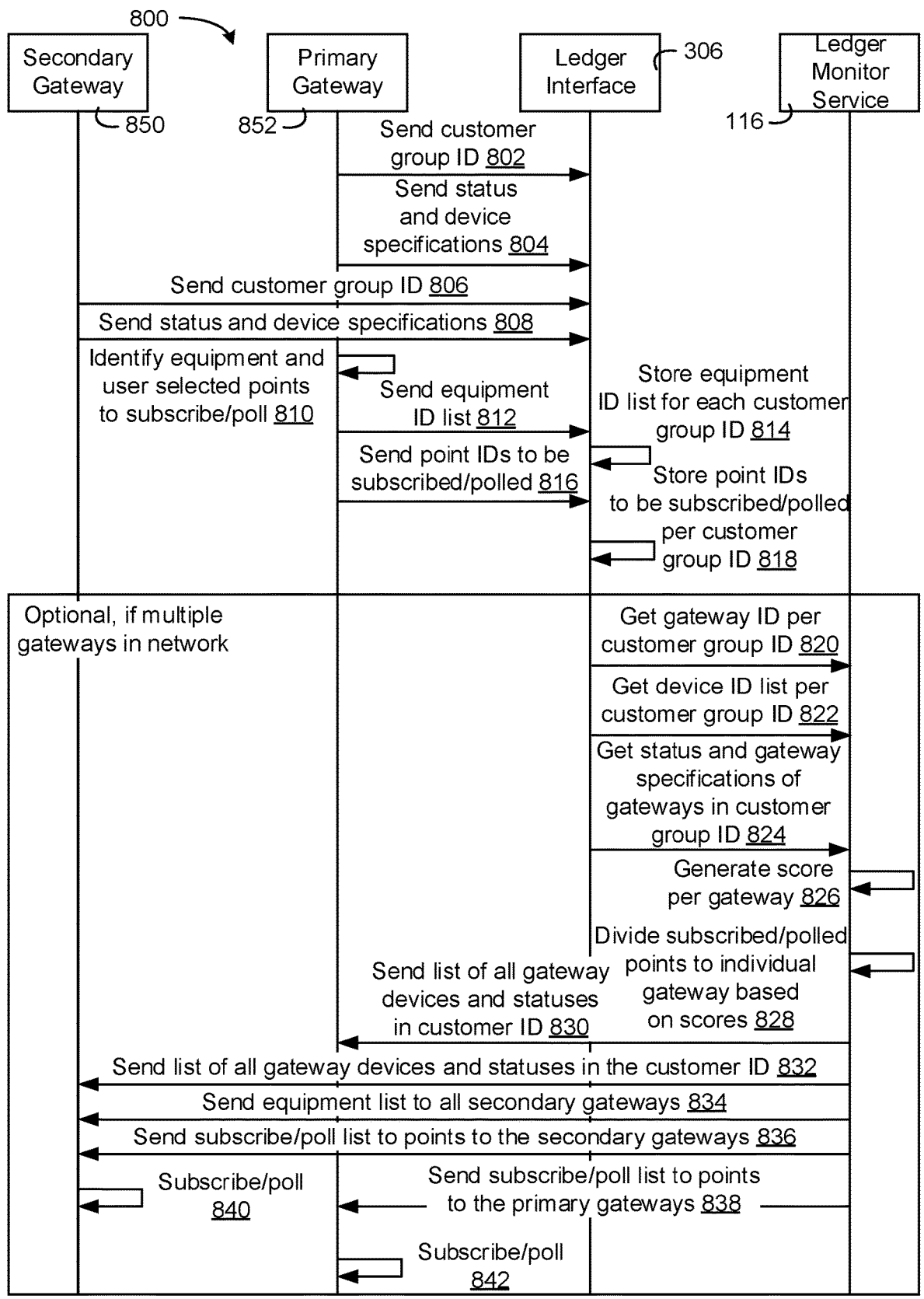
FIG. 8 is a flow diagram of a startup process for a network of gateways and the ledger server, according to an exemplary embodiment.

Referring now to FIG. 8, a startup process for a network of gateways and the ledger server 112, according to an exemplary embodiment. The process 800 can be performed by the ledger monitor service 116, the ledger interface 306, a secondary gateway 850, and a primary gateway 852. The primary gateway 852 and/or the secondary gateway 850 can be any of the software gateways described herein, e.g., the software gateways 118-136 as described with reference to FIG. 1, the gateways 201-224 as described with reference to FIG. 2, and/or the software gateways 324, 332, and 340 as described with reference to FIG. 3.

In step 802, the primary gateway 852 can send a customer group identifier to the ledger interface 306. In step 804, the primary gateway 852 can send a status and device specifications of the primary gateway 852 to the ledger interface 306. Similarly, the secondary gateway 850 can send the customer group identifier to the ledger interface 306 in step 806 and can send status and device specifications of the secondary gateway 850 to the ledger interface 306 in the step 808.

In step 810, the primary gateway 852 can identify equipment points of the equipment. In some embodiments, the primary gateway 852 identifies the point assignments of the building equipment to the primary gateway 852 and the secondary gateway 850 that a user has selected. In step 812, the primary gateway 852 can send an equipment list of the building equipment identified in the step 810 to the ledger interface 306. The equipment list can include an identifier for each of the pieces of building equipment. In step 814, the ledger interface 306 can store a list of equipment identifiers for each of multiple customer group identifiers based on the list received in the step 812.

Furthermore, in step 816, the primary gateway 852 can send point identifiers to be subscribed and/or polled, the points identified in the step 810. In step 818, the ledger interface 306 stores the point identifiers to be subscribed to and/or polled per customer group identifiers. If there are multiple gateways on the network, i.e., the primary gateway 852 and the secondary gateway 850, the steps 820-842 can be performed as part of the process 800.

In step 820, the ledger monitor service 116 can get gateway identifiers for a particular customer group identifier from the ledger interface 306. In step 822, the ledger monitor service 116 can get a device identifier list for a customer group identifier from the ledger interface 306. In step 824, the ledger monitor service 116 can get a status and device specification for each device in the customer group identifier from the ledger interface 306.

In step 826, the ledger monitor service 116 can generate a gateway score for each gateway of the customer group identifier. The score can be generated based on the gateway specifications and status information of the gateways. In step 828, based on the scores of all of the gateways determined in the step 828, the ledger monitor service 116 can divide subscribed/polled points of the customer group identifier to the gateways of the customer group identifier based on the scores of the gateways of the customer group identifier determines in the step 826.

In some embodiments, the information communicated to the primary gateway 852 and the secondary gateway 850 in the steps 830-838 can be communicated in a ledger file generated by the ledger monitor service 116. In step 830, the ledger monitor service 116 can send a list of all gateway devices and statuses in a particular customer identifier to the primary gateway 852. In step 832, the same information as in step 830 can be communicated to the secondary gateway 850.

In step 834, the ledger monitor service 116 can communicate an equipment list to all secondary gateways, e.g., the secondary gateway 850. In step 836, the ledger monitor service 116 can communicate a list of points for the secondary gateways, i.e., the secondary gateway 850, to subscribe to and/or poll. The list of points may be assigned to the secondary gateway 850 in the step 828. Similarly, in step 838, the ledger monitor service 116 can send a list of points for the primary gateways, i.e., the primary gateway 852, to subscribe to and/or poll. The points of the primary gateway to subscribe to and/or poll can be determined in the step 828 by the ledger monitor service 116. In steps 840 and 842, the primary gateway 852 and the secondary gateway 850 can subscribe to and/or poll the points that they are assigned.

Figure 9:
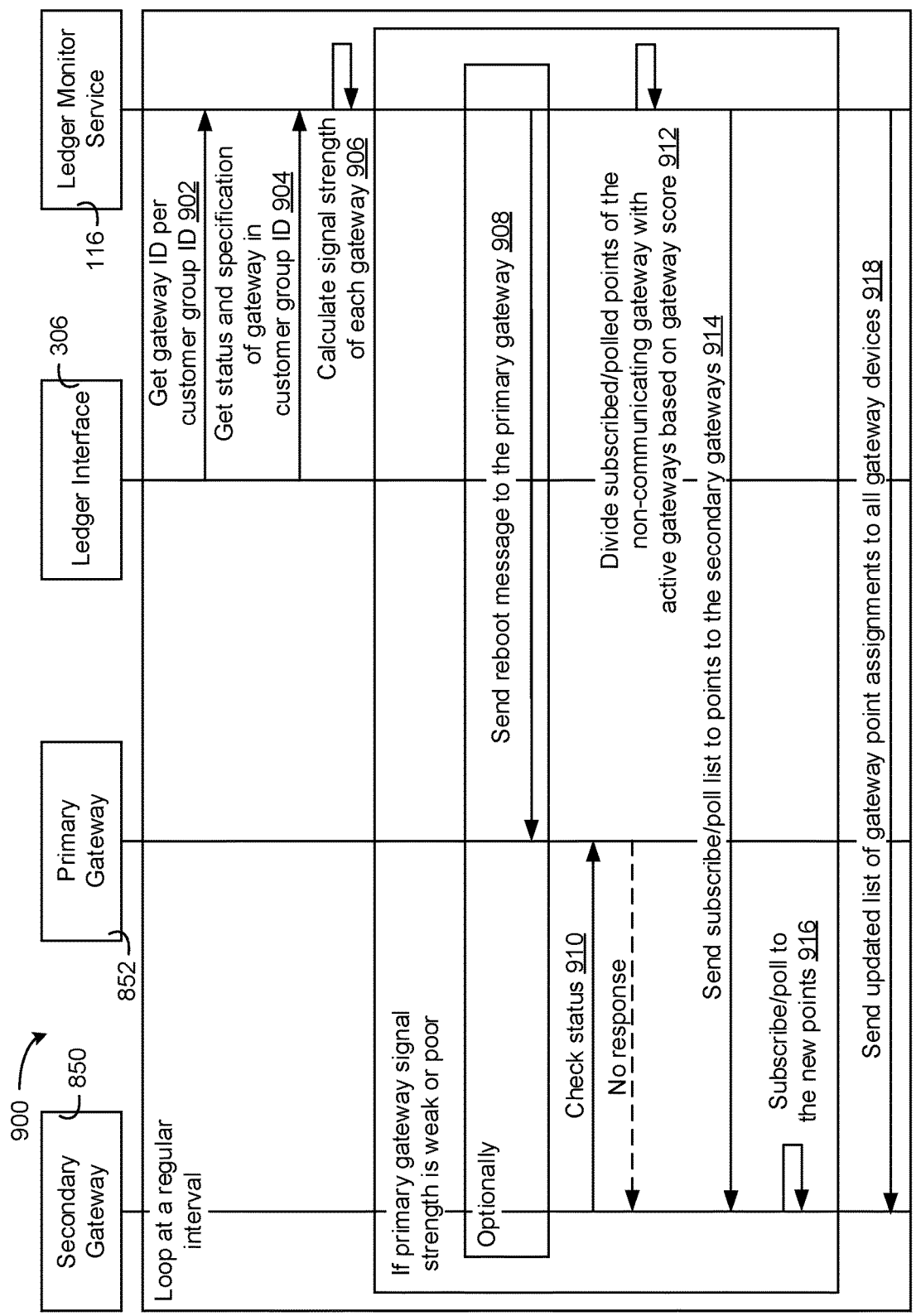
FIG. 9 is a flow diagram of a gateway failure recovery process for the network of gateways of FIG. 8 and the ledger server of FIG. 1, according to an exemplary embodiment.

Referring now to FIG. 9, a gateway failure recovery process 900 for the network of gateways is shown, according to an exemplary embodiment. The process 900 can be performed by the ledger monitor service 116, the ledger interface 306, the secondary gateway 850, and the primary gateway 852. In the process 900, the steps 902-918 can be performed at a regular interval. Furthermore, in response to a determination of a weak signal strength for a particular gateway in the step 906, the process can perform the steps 908-918. The step 908, in some embodiments, is an optional step.

In step 902, the ledger monitor service can retrieve a gateway identifier for each gateway of a customer group identifier from the ledger interface 306. In step 904, the ledger monitor service 116 can get a status and specification of each of the gateways in the customer group identifier. The status information may be indicated by heartbeat messages communicated from the primary gateway 852 and/or the secondary gateway 850 to the ledger interface 306. In step 906, the ledger monitor service 116 generate a signal strength for each of the gateways in the customer group identifier. The signal strengths can be generated based on the status information received in the step 904.

If one of the gateways has a weak signal strength, in FIG. 8 the primary gateway 852, the ledger monitor service 116 can send a reboot message to the primary gateway 852. The primary gateway 852 can, if it receives the reboot message, reboot. This may fix the signal strength problems with the primary gateway 852. In step 910, the secondary gateway 850 may check a status of the primary gateway 852 by sending a message to the primary gateway 852. In some embodiments, the secondary gateway 850 receives a response from the primary gateway 852 and the secondary gateway 850 can communicate with the ledger monitor service 116 to indicate that the primary gateway 852 is operating even though it is not properly communicating with the ledger monitor service 116. In some cases, the primary gateway 852 does not respond to the secondary gateway 850. The secondary gateway 850 can provide an indication of the failed response to the ledger monitor service 116.

In step 912, the ledger monitor service 116 can divide the subscribed and/or polled points of the non-communicating gateway, i.e., the primary gateway 852, with active gateways, e.g., the secondary gateway 850. The divisional of the points can be performed based on the score of the secondary gateway 850 and/or scores of other secondary gateways. In step 914, the ledger monitor service 116 can send a list of points to be subscribed to and/or polled to the secondary gateway 850. The points may be the points divided in the step 912. Receiving the new points can cause the secondary gateway 850 to subscribe to and/or poll the new points in step 916. Furthermore, at a particular interval, in step 918, the ledger monitor service 116 can periodically send a list of gateway point assignments to all active gateways, e.g., the secondary gateway 850.

Figure 10:
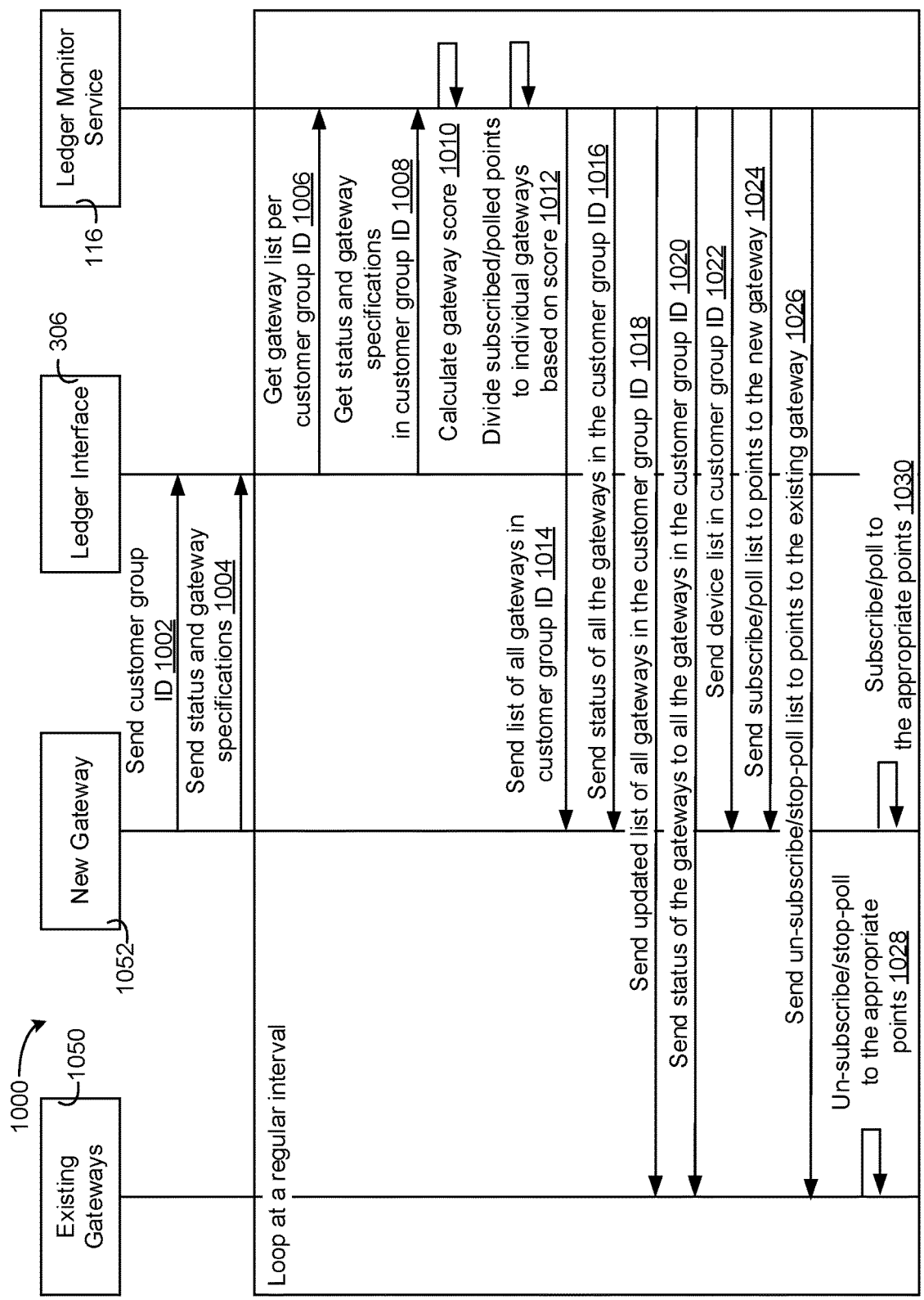
FIG. 10 is a flow diagram of a process of adding new gateways to an existing network of gateways, according to an exemplary embodiment.

Referring now to FIG. 10, a process 1000 of adding new gateways to an existing network of gateways is shown, according to an exemplary embodiment. The process 1000 can be performed by the ledger monitor service 116, the ledger interface 306, existing gateways 1050, and a new gateway 1052. The existing gateways 1050 and/or the new gateway 1052 can be any of the software gateways described herein, e.g., the software gateways 118-136 as described with reference to FIG. 1, the gateways 201-224 as described with reference to FIG. 2, and/or the software gateways 324, 332, and 340 as described with reference to FIG. 3. The existing gateways 1050 can be gateways that already exist on a network before the new gateway 1052 is added to the network. In some cases, the steps 1006-1030 of the process 1000 may be performed at a regular interval.

In step 1002, the new gateway 1052 can send a customer group identifier to the ledger interface 306. The new gateway 1052 can send the customer group identifier to the ledger interface 306 in response to being added to a network of the existing gateways 1050. In step 1004, the new gateway 1052 can send status information and gateway specifications of the new gateway 1052 to the ledger interface 306.

In step 1006, the ledger monitor service 116 can get a gateway list for the customer group identifier from the ledger interface 306. In step 1008, the ledger monitor service 116 can get status and gateways specifications for all of the gateways in the customer group identifier from the ledger interface 306. Based on the status and specification information received in the step 1008, the ledger monitor service 116 can generate a score for each of the gateways in step 1010.

In step 1012, the ledger monitor service 116 can divide subscribed and/or polled points of the existing gateways 1050 across the existing gateways 1050 and the new gateway 1052 based on the score of each gateway. In some embodiments, the information communicated to the existing gateways 1050 and/or the new gateway 1052 from the ledger monitor service 116 in the steps 1014-1026 is communicated through a ledger.

In step 1014, the ledger monitor service 116 sends a list of all gateways in the customer group identifier to the new gateway 1052. In step 1016, the ledger monitor service 116 sends a status of each of the gateways in the customer group identifier to the new gateway 1052. In step 1018, the ledger monitor service 116 sends an updated list of all gateways in the customer group identifier, the updated list may be an update to a list stored on the existing gateways 1050, the update indicating the presence of the new gateway 1052. In step 1020, the ledger monitor service 116 can send a status of each of the gateways in the customer group identifier to the existing gateways 1050.

In step 1016, the ledger monitor service 116 can send a device list of all building devices in the customer group identifier to the new gateway 1052. In step 1024, the ledger monitor service 116 sends a list of points for the new gateway 1052 to subscribe to and/or poll. Furthermore, in step 1026, the ledger monitor service 116 can send a list of points for the existing gateways 1050 to stop subscribing to and/or polling. These points sent to the existing gateways 1050 can be the points assigned to the new gateway 1052. In step 1028 the existing gateways 1050 can stop subscribing and/or polling the points indicated in the list of the step 1026. In the step 1030 the new gateway 1052 can subscribe to and/or poll the points indicated in the step 1024.

Signal Strength

Referring again to FIG. 3, the ledger monitor service 116 can be configured to calculate device signal strength for each of the software gateways 324, 332, and/or 340. The device signal strength may be a status of a gateway calculated based on heartbeat messages from the gateway to the ledger monitor service 116. The ledger monitor service 116 may first confirm that a gateway is down before trying to replace it with another device. In some cases, a temporary network connectivity issues might make a gateway appear to be down to the ledger monitor service 116 is down. Since the network connectivity issue is temporary, the gateway may return to being online. Shutting down or reassigning points of a gateway in response to a temporary network connectivity issue may cause unnecessary issues. In this regard, the ledger monitor service 116 can determine whether a gateway is experiencing a critical fault based on signal strengths. Using signal strengths can help the ledger monitor service 116 ignore temporary connectivity issues or other temporary faults that may temporarily cause a software gateway to operate improperly.

In some embodiments, the ledger monitor service 116 can generate a user interface and cause the user interface to display an indication of signal strengths for the various software gateways 324, 332, and/or 340. Via a user device that accesses the user interface, an administrator or other user from any part of the world can monitor the connectivity of the software gateways 324, 332, and/or 340 and take appropriate action.

In some embodiments, the ledger monitor service 116 can reduce false gateway offline detections and/or notifications by using an accumulated weighted average for calculating the score of the gateway. If the weighted average falls under a preset value for a particular gateway, the ledger monitor service 116 can be configured to generate a notification that the gateway is not operating properly.

Each of the software gateways 324, 332, and/or 340 can be configured to identify and assign a timeseries identifier as a heartbeat identifier and at a regular interval, each of the software gateways 324, 332, and/or 340 can send a sample value along with a timestamp as a heartbeat. In some embodiments, a parameter in each of the software gateways 324, 332, and/or 340 (which may be universal across all of the software gateways), may identify a frequency at which each of the software gateways 324, 332, and/or 340 send the heartbeat message to the ledger monitor service 116.

Referring again generally to FIG. 3, a heartbeat is a timeseries sample sent by one of the software gateways 324, 332, and/or 340 at a scheduled interval. The heartbeat interval can be configured through a user interface. The ledger monitor service 116 can generate two parameters for the software gateways 324, 332, and/or 340 based on the heartbeat messages received from the software gateways 324, 332, and/or 340. The two parameters may reduce false gateway fault determinations, the parameters may be cloud connection efficiency and cloud connection accumulated weightage. The cloud connection efficiency can be generated by the ledger monitor service 116 by counting the total heartbeat messages that have been received in the specified timeframe by the total heartbeat samples that should be received. The cloud connection accumulated weightage can be generated by the ledger monitor service 116 by counting the total heartbeat messages in a specified timeframe and/or assigning weightage to heartbeat messages received at a regular interval in a timeframe with most recent message in the timeframe carrying a higher weightage than the message received earlier in the timeframe.

Cloud Connection Efficiency

For each heartbeat message received within a time window, a weightage can be assigned to each of the heartbeat messages with higher weightage provided to the most recent message to and a lowest weightage being applied to an earliest message in the time window. The sum of the weightage assigned may be one hundred. The accumulated weightage can be determined by the ledger monitor service 116 can be the sum of the weightage values of the heartbeat messages received in the time window.

In some embodiments, the gateway strength is for a time window and the following procedure can be used. First, the ledger monitor service 116 can be configured to calculate the expected heartbeat values as $$\frac{60}{\text{Heartbeat Refresh Time}}.$$

Second the ledger monitor service 116 can calculate the received heartbeat values as an amount of received values from a get request from the ledger interface 306. Third, the ledger monitor service 116 can be configured to calculate missing heartbeat values as an expected heartbeat values minus received heartbeat values.

In some embodiment, if the value at the expected time does not exist, the weight will be assigned zero by the ledger monitor service 116. Seventh, the ledger monitor service 116 can calculate a strength value. The strength can be categorized by the ledger monitor service 116 as excellent, good, average, poor, or no signal. Connection strength can be categorized as excellent when Strength=100. Connection strength can be categorized as good for strength values where 90≤Strength<100). Connection strength can be categorized as average for strength values where 50≤Strength<90. Connection strength can be categorized as poor where 0<Strength<50. Connection strength can be categorized as no signal where Strength=0.

The signal strength is a value that can be calculated based on an accumulated weightage of the value received. If all the values in a signal have been received, then the ledger monitor service 116 can set the cloud connection reliability as "excellent." If weightage of the values>85 and less than 100, then the ledger monitor service 116 can set the cloud connection reliability as "good." If weightage of the values>50 but less than <85, then the ledger monitor service 116 can set the cloud connection reliability as "fair." If weightage of the value is >0 but <50, then the ledger monitor service 116 can set the cloud connection reliability as "poor." If no value is received, the ledger monitor service 116 can set the cloud connection reliability is "no signal."

Figure 11:
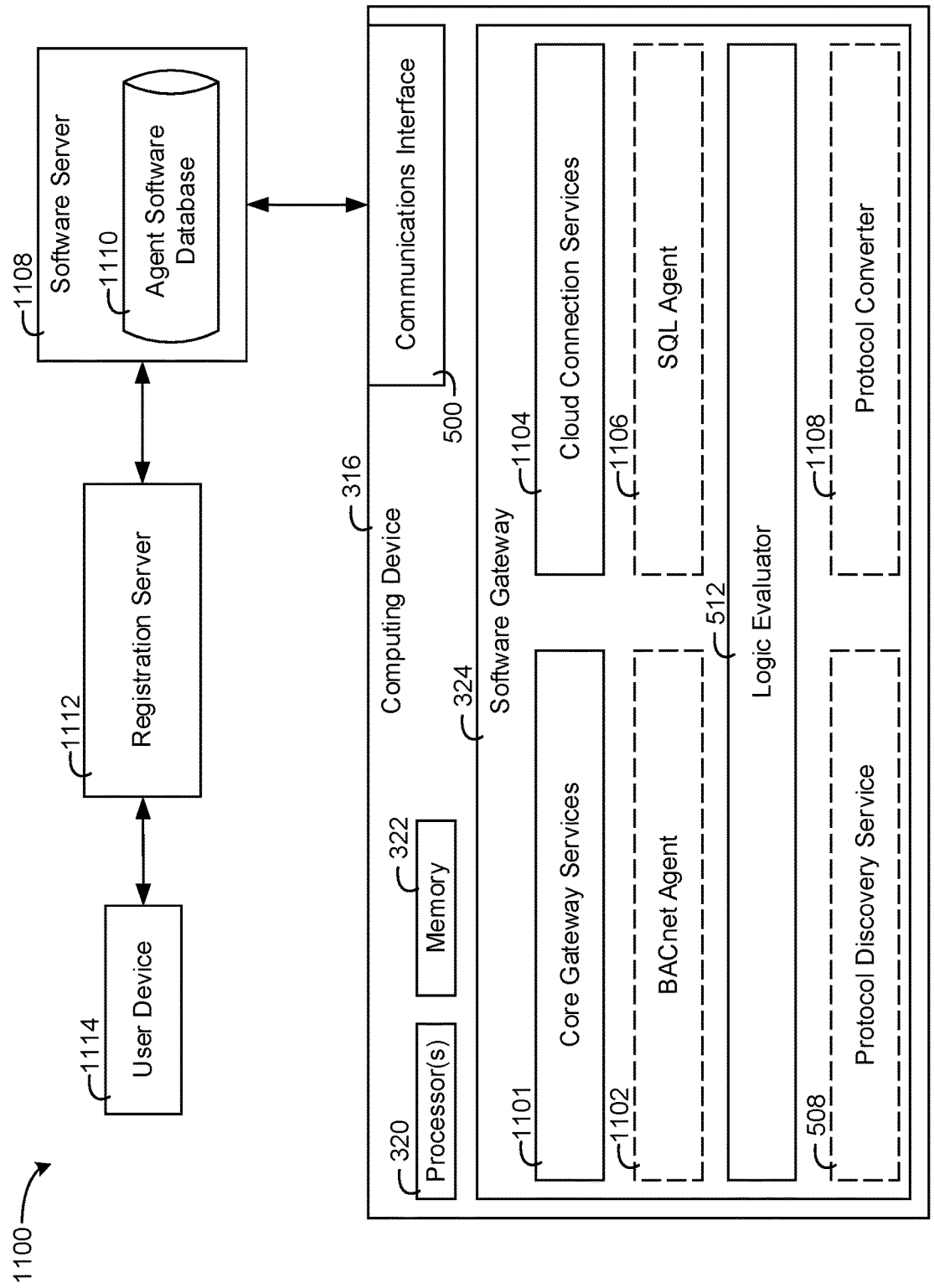
FIG. 11 is a block diagram of a system including software gateway receiving software agents from a software server, according to an exemplary embodiment.

Referring now to FIG. 11, a system 1100 including the software gateway 324 and a software server 1108, according to an exemplary embodiment. The system 1100 includes a software server 1108, a registration server 1112, and a user device 1114. The registration server 1112 and/or the software server 1108 can be can be one or multiple server devices or can be software component of a cloud computing/resource platform, e.g., Amazon Web Services, Microsoft Azure, etc. The user device 1114 can be a user device (e.g., a cellphone, a smartphone, a laptop, a desktop computer, a tablet, etc.).

In some embodiments, a user, via the user device 1114 can, via the registration server 1112 can register their building with the registration server 1112. Registering the building can include requesting software gateways and/or indicating the requirements of the building, e.g., what type of equipment is located in the building, what the protocols of the different pieces of equipment are, etc. For example, the information may indicate that they have three chillers, two air handler units, four thermostats, etc. The information may further indicate what the different protocols of the equipment are, e.g., BACnet, SQL, CAN, etc.

In some embodiments, the registration server 1112 can compile the registration information received from the user device 1114 and identify one or more gateways for deployment to the building. For example, the registration server 1112 could identify that four gateways are required for a building based on the registration details provided by the user via the user device 1114. The registration server 1112 can generate one or more identifiers and/or keys for the software gateways, deploy the software gateways to computing devices of the building, and/or push agents to the software gateways. For example, if the registration server 1112 identifies that two gateways are necessary for the building, one focused on collecting BACnet data and another gateway focused on collecting SQL data, the registration server 1112 can cause the first gateway to receive a BACnet agent from the software server 1108 and an SQL agent from the software server 1108. The software server 1108 may store a repository of agent programs, i.e., in agent software database 1110.

The software gateway 324 includes a core gateway services 1101, cloud connection service 1104, a BACnet agent 1102, and an SQL agent 1106. The core gateway services 1101 can be configured to run the core services of the software gateway 324, e.g., collecting data, pushing collected data to the cloud, etc. The cloud connection services 1104 can facilitate registration of the software gateway 324, e.g., installing updates, retrieving configuration from the software server 1108, etc. The BACnet agent 1102 can be configured to collect and aggregate data for a BACnet protocol while the SQL agent 1106 can be configured to collect and aggregate data for an SQL protocol.

The software gateway 324 of FIG. 11 is shown to include the logic evaluator 512 and the protocol discovery service 508 as described with reference to FIG. 5. Furthermore, the software gateway 324 includes a protocol converter 1108. In some embodiments, the logic evaluator 512 is configured to self-assess the abilities and requirements for the software gateway 324. The abilities may be limited based on the hardware that the computing device 316 includes, e.g., processing and input/output components, e.g., the processor(s) 320, the memory 322, and/or the communications interface 500. The requirements may be based on the ledger file that the software gateway 324 receives, i.e., what points or processing (e.g., communication protocols, data cleansing algorithms, data aggregation algorithms, etc.) that the software gateway 324 is assigned to perform. The logic evaluator 512 can be configured to self-assess the requirements of the software gateway 324 and retrieve software components from the software server 1108 based on software requirement determinations made through the self-assessment.

Examples of the software components may be the protocol discover service 508 or the protocol converter 1108. For example, the logic evaluator 512 may identify that the software gateway 324 is unaware of the protocols used by equipment connected by the software gateway 324. In this regard, the logic evaluator 512 could retrieve the protocol discover service 508 from the software server 1108 and install the protocol discover service 508 on the software gateway 324. Furthermore, in some cases, the logic evaluator 512 can determine that the software gateway 324 needs to convert between two protocols, e.g., from BACnet to CAN or from SQL to BACnet. The logic evaluator 512 can, in response to an identification of a required conversion service, retrieve a service configured to perform the required conversion from the software server 1108, e.g., the protocol converter 1108.

Figure 12:
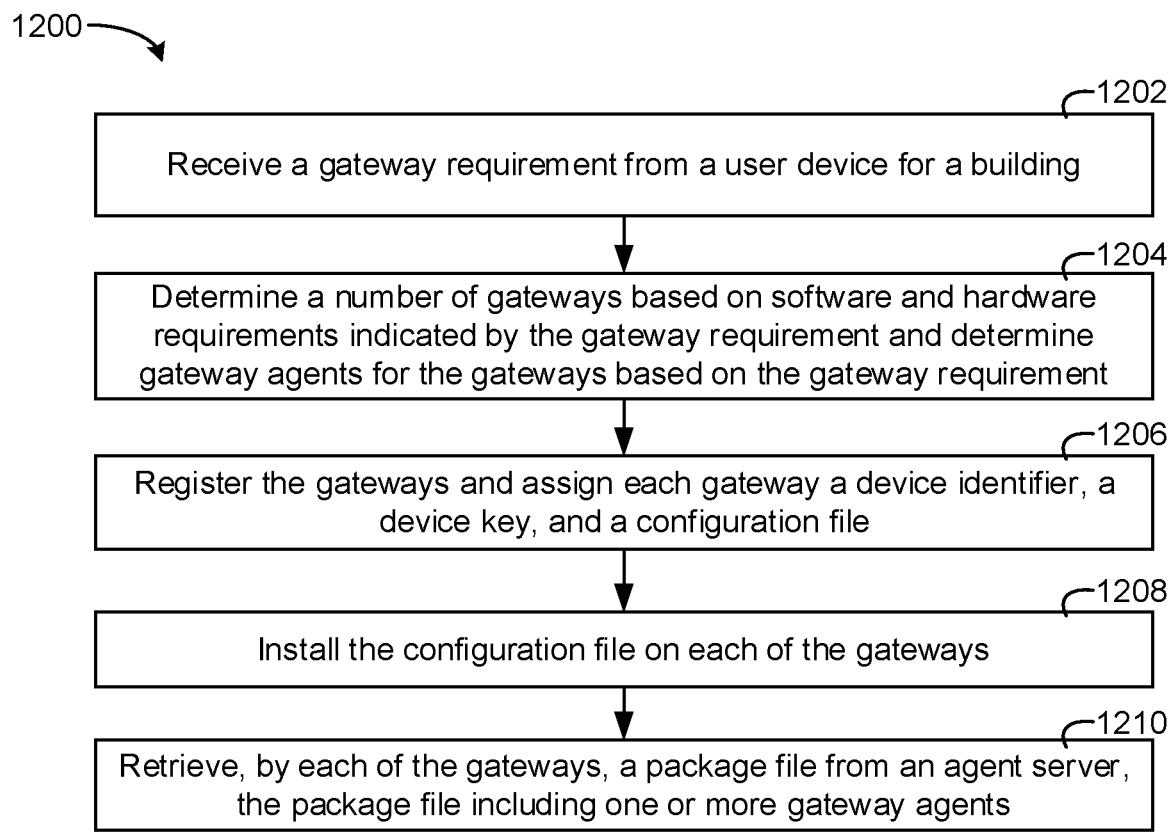
FIG. 12 is a flow diagram of a process of registering the software gateway of FIG. 11 and installing the software agents on the software gateway, according to an exemplary embodiment.

Referring now to FIG. 12, a process 1200 of registering the software gateway of FIG. 11 and installing the software agents on the software gateway is shown, according to an exemplary embodiment. The software gateway 324, the registration server 1112, and/or the software server 1108 can be configured to perform the process 1200. In some embodiments any of the software gateways as described herein can be configured to perform the process 1200. In some embodiments, any of the software gateways described herein, e.g., the software gateways 118-136 as described with reference to FIG. 1, the gateways 201-224 as described with reference to FIG. 2, and/or the software gateways 324, 332, and 340 as described with reference to FIG. 3 can be configured to perform the process 1200.

In step 1202, the registration server 1112 can receive a gateway requirement from a user device for a building. The gateway requirement could be that a building has a particular number of building devices and an indication of the various protocols that the various building devices communicate via. In step 1204, the registration server 1112 can determine a number of software gateways based on the gateway requirement, e.g., the number of gateways necessary to handle the number of building devices and/or the number of points of the building devices. Furthermore, based on the gateway requirement of the step 1202, the registration server 1112 can determine what software agents are necessary for running on the various gateways. For example, if the building equipment for one gateway communicate via BACnet and SQL, the registration server 1112 can identify that a BACnet agent and an SQL agent are necessary for deployment on the gateway. If another gateway will manage devices that communicate via BACnet, the registration server 1112 can determine that a BACnet agent is required for the gateway.

In step 1206, the registration server 1112 can register the gateways and assign each gateway a device identifier, a device key, and a configuration file. The registration server 1112 can register the gateways by saving an indication of each gateway, i.e., by storing the device identifier and the device key. In step 1208, the registration server 1112 can install the configuration file on a computing device, the configuration file can implement a software gateway. Once the installation file is installed on the computing device, the computing device can operate as a gateway. In step 1210, each of the gateways can retrieve a package file from an agent server, the package file may have the various agents that the gateways implement. In some embodiments, the registration server 1112 can communicate with the software server 1108, the software server 1108 can retrieve agents from the agent software database 1110 and communicate the agents to the software gateways.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. A method of software gateways of a building, the method comprising:
   generating a ledger file including first point assignments for a first software gateway and second point assignments for a second software gateway, wherein a first computing system implements the first software gateway, and wherein a second computing system implements the second software gateway;
communicating the ledger file to the first software gateway and the second software gateway;
collecting, by the first software gateway, first points of the first point assignments based on the ledger file and collecting, by the second software gateway, second points of the second point assignments based on the ledger file;
updating the ledger file to move a point assignment of the first point assignments for the first software gateway to the second point assignments for the second software gateway;
subscribing, by the second software gateway, to the point assignment responsive to detecting, by the second software gateway using the ledger file, that the point assignment moved to the second point assignments;
collecting, by the second software gateway, a point of the point assignment based on the subscription; and
unsubscribing, by the first software gateway, from the point assignment responsive to detecting, by the first software gateway using the ledger file, that the point assignment moved to the second point assignments.

2. The method of claim 1, wherein the ledger file is generated by a ledger server in communication with the first software gateway and the second software gateway.

3. The method of claim 1, further comprising:
determining, by a ledger server, that the first software gateway has encountered a failure;
generating, by the ledger server, an updated ledger file, the updated ledger file being an updated version of the ledger file, wherein generating the updated ledger file includes causing the point assignment of the first point assignments for the first software gateway to be assigned to the second software gateway;
communicating, by the ledger server, the updated ledger file to the second software gateway; and
managing, by the second software gateway, the point of the point assignment of the updated ledger file.

4. The method of claim 1, further comprising:
receiving, by the first software gateway, a plurality of data values of a data point of a piece of building equipment;
validating, by the first software gateway, the plurality of data values based on one or more descriptors of the data point;
generating, by the first software gateway, a reliability value for each of the plurality of data values based on a validation of each of the plurality of data values; and
communicating, by the first software gateway, the plurality of data values with the reliability value for each of the plurality of data values to a building management system.

5. The method of claim 1, further comprising:
determining, by the first software gateway, a description of hardware resources of the first computing system on which the first software gateway is implemented;
determining, by the first software gateway, one or more operational tasks of the first software gateway;
identifying, by the first software gateway, one or more software components based on the description of hardware resources of the first computing system and the one or more operational tasks;
retrieving, by the first software gateway, the one or more software components from an external software storage system; and
executing, by the first software gateway, the one or more software components.

6. The method of claim 1, further comprising generating, by a ledger server, the ledger file by:
dividing a set of points of equipment of the building into the first point assignments and the second point assignments based on first information describing the first computing system, the first computing system running the first software gateway, and second information describing the second computing system, the second computing system running the second software gateway.

7. The method of claim 6, further comprising:
communicating, by the first software gateway, the first information describing the first computing system, the first computing running the first software gateway to the ledger server; and
communicating, by the second software gateway, the second information describing the second computing system, the second computing system running the second software gateway to the ledger server.

8. The method of claim 1, further comprising
receiving, by a ledger server, an indication of an addition or a removal of a piece of equipment from a building network of the building;
generating, by the ledger server, an updated ledger file including updated point assignments for the first software gateway of the building network, the updated ledger file being an updated version of the ledger file, wherein generating the updated ledger file includes causing a previous point assignment of the ledger file to be updated based on the indication of the addition or the removal of the piece of equipment; and
communicating, by the ledger server, the updated ledger file to the first software gateway and the second software gateway.

9. The method of claim 8, further comprising:
performing, by the first software gateway responsive to receiving the updated ledger file, at least one of:
beginning management of one or more first points of the building network based on the updated point assignments of the updated ledger file; or
stopping management of one or more second points of the building network based on the updated point assignments of the updated ledger file.

10. A building system for managing software gateways of a building, the building system comprising:
a ledger server configured to:
generate a ledger file including first point assignments for a first software gateway and second point assignments for a second software gateway, wherein a first computing system implements the first software gateway, and wherein a second computing system implements the second software gateway;
update the ledger file to move a point assignment of the first point assignments for the first software gateway to the second point assignments for the second software gateway; and
communicate the ledger file to the first software gateway and the second software gateway;
the first software gateway configured to:
collect first points of the first point assignments based on the ledger file; and
unsubscribe from the point assignment responsive to detecting that the point assignment moved to the second point assignments; and the second software gateway configured to:
  collect second points of the second point assignments based on the ledger file;
  subscribe to the point assignment responsive to detecting that the point assignment moved to the second point assignments; and
  collect a point of the point assignment based on the subscription.

11. The building system of claim 10, wherein the ledger server is configured to:
  determine that the first software gateway has encountered a failure;
  generate an updated ledger file including, the updated ledger file being an updated version of the ledger file, wherein generating the updated ledger file includes causing the point assignment of the first point assignments for the first software gateway to be assigned to the second software gateway; and
  communicate the updated ledger file to the second software gateway;
  wherein the second software gateway is configured to:
    manage the point of the point assignment of the updated ledger file.

12. The building system of claim 10, wherein the first software gateway is configured to:
  receive a plurality of data values of a data point of a piece of building equipment;
  validate the plurality of data values based on one or more descriptors of the data point;
  generate a reliability value for each of the plurality of data values based on a validation of each of the plurality of data values; and
  communicate the plurality of data values with the reliability value for each of the plurality of data values to a building management system.

13. The building system of claim 10, wherein the first software gateway is configured to:
  determine a description of hardware resources of the first computing system on which the first software gateway is implemented;
  determine one or more operational tasks of the first software gateway;
  identify one or more software components based on the description of hardware resources of the first computing system and the one or more operational tasks;
  retrieve the one or more software components from an external software storage system; and
  execute the one or more software components.

14. The building system of claim 10, wherein the ledger server is configured to generate the ledger file by:
  dividing a set of points of equipment of the building into the first point assignments and the second point assignments based on first information describing the first computing system, the first computing system running the first software gateway, and second information describing the second computing system, the second computing system running the second software gateway.

15. The building system of claim 14, wherein the first software gateway is configured to:
  communicate the first information describing the first computing system, the first computing system running the first software gateway to the ledger server;
  wherein the second software gateway is configured to:
    communicate the second information describing the second computing system, the second computing system running the second software gateway to the ledger server.

16. The building system of claim 10, wherein the ledger server is configured to:
  receive an indication of an addition or a removal of a piece of equipment from a building network of the building;
  generate an updated ledger file including updated point assignments for the first software gateway of the building network, the updated ledger file being an updated version of the ledger file, wherein generating the updated ledger file includes causing a previous point assignment of the ledger file to be updated based on the indication of the addition or the removal of the piece of equipment; and
  communicate the updated ledger file to the first software gateway and the second software gateway.

17. The building system of claim 16, wherein the first software gateway is configured to perform at least one of, responsive to receiving the updated ledger file:
  beginning management of one or more first points of the building network based on the updated point assignments of the updated ledger file; or
  stopping management of one or more second points of the building network based on the updated point assignments of the updated ledger file.

18. One or more non-transitory storage medium storing instructions thereon that, when executed by one or more processors of a computing system, cause the computing system to implement a software gateway configured to:
  receive a ledger file generated by a ledger server, the ledger server generating the ledger file including first point assignments for the software gateway and second point assignments for a second software gateway, wherein a second computing system implements the second software gateway;
  collect first points of the first point assignments based on the ledger file, wherein the second software gateway collects second points of the second point assignments based on the ledger file;
  receive an updated ledger file from the ledger server, wherein the ledger server updates the ledger file to move a point assignment of the second point assignments for the second software gateway to the first point assignments for the software gateway;
  subscribe to the point assignment responsive to detecting that the point assignment moved to the first point assignments for the software gateway; and
  collect a point of the point assignment based on the subscription.

19. The one or more non-transitory storage medium of claim 18, wherein the software gateway is configured to:
  receive a plurality of data values of a data point of a piece of building equipment;
  validate the plurality of data values based on one or more descriptors of the data point;
  generate a reliability value for each of the plurality of data values based on a validation of each of the plurality of data values; and
  communicate the plurality of data values with the reliability value for each of the plurality of data values to a building management system.

20. The one or more non-transitory storage medium of claim 18, wherein the software gateway is configured to:

determine a description of hardware resources of the computing system on which the software gateway is implemented;
determine one or more operational tasks of the software gateway;
identify one or more software components based on the description of hardware resources of the computing system and the one or more operational tasks;
retrieve the one or more software components from an external software storage system; and
execute the one or more software components.

* * * * *